(12) United States Patent
Kojima et al.

(10) Patent No.: US 6,345,116 B1
(45) Date of Patent: *Feb. 5, 2002

(54) IMAGE PROCESSING APPARATUS

(75) Inventors: Akio Kojima, Neyagawashi; Yasuhiro Kuwahara, Osakashi; Masao Kataoka, Moriguchishi; Teruyuki Naka, Izumisi; Thuneharu Tomita, Osakashi; Atsushi Sogami, Sandashi, all of (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,224

(22) Filed: May 30, 1997

(30) Foreign Application Priority Data

May 31, 1996 (JP) .............................................. 8-139170

(51) Int. Cl.⁷ ................................................ G06K 9/00
(52) U.S. Cl. ........................ 382/167; 382/162; 358/518; 358/523
(58) Field of Search ................................ 358/505, 512, 358/515, 516, 517, 518, 521, 523, 524, 473, 474, 497; 382/162, 167, 312, 313, 163, 318, 293, 294, 295; 345/156, 158, 165; 250/208.1, 208.3

(56) References Cited

U.S. PATENT DOCUMENTS

| 5,058,181 A | * | 10/1991 | Ishihara et al. ............. 382/199 |
| 5,355,146 A | * | 10/1994 | Chiu et al. .................. 345/156 |
| 5,465,307 A | * | 11/1995 | Azumaya et al. ........... 382/165 |
| 5,578,813 A | * | 11/1996 | Allen et al. .............. 250/208.1 |
| 5,595,445 A | * | 1/1997 | Bobry ......................... 400/88 |
| 5,720,021 A | * | 2/1998 | Murata et al. .............. 345/438 |
| 5,729,008 A | * | 3/1998 | Blalock et al. .......... 250/208.1 |
| 5,896,403 A | * | 4/1999 | Nagasaki et al. ............. 369/14 |
| 5,909,521 A | * | 6/1999 | Nakao et al. ................ 382/312 |
| 5,930,411 A | * | 7/1999 | Kojima et al. .............. 382/312 |
| 5,949,921 A | * | 9/1999 | Kojima et al. .............. 382/295 |

* cited by examiner

*Primary Examiner*—Edward Coles
*Assistant Examiner*—Joseph R. Pokrzywa
(74) *Attorney, Agent, or Firm*—Parkhurst & Wendel, L.L.P.

(57) ABSTRACT

By connecting correction information storing means to an exterior computer, such as a personal computer, and then utilizing the personal computer as a second image storing means, it is possible that correction information is read from the correction information storing means and M value gradation image data is read from the second image storing means, to reproduce the read M value gradation image in a state where position errors at connection part has been corrected In addition, since image data having N value smaller than M value is stored in a first image storing means that is required to be installed as an inner memory, it is possible to suppress the storage capacity of the first image storing means. As a result, the invention provides an image processing apparatus capable of reading gradation image with reduced memory costs of storing means.

2 Claims, 19 Drawing Sheets

Fig.12 (a)

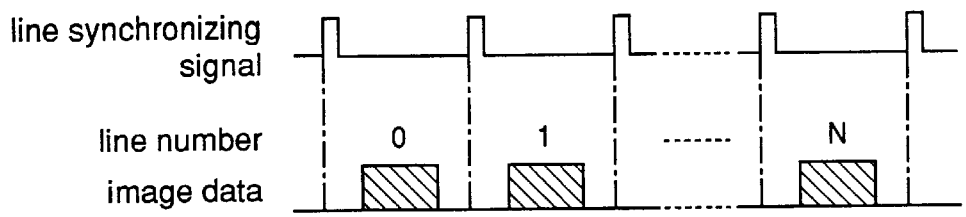

Fig.12 (b)

storage format for corretion information memory

| line number | $X_s$ coordinate | $Y_s$ coordinate | $X_e$ coordinate | $Y_e$ coordinate | X off | Y off |
|---|---|---|---|---|---|---|
| 0 | $X_{s0}$ | $Y_{s0}$ | $X_{e0}$ | $Y_{e0}$ | X off 1 | Y off 1 |
| 1 | $X_{s1}$ | $Y_{s1}$ | $X_{e1}$ | $Y_{e1}$ | X off 2 | Y off 2 |
| 2 | $X_{s2}$ | $Y_{s2}$ | $X_{e2}$ | $Y_{e2}$ | X off 3 | Y off 3 |
| ⋮ | ⋮ | ⋮ | ⋮ | ⋮ | ⋮ | ⋮ |
| N | $X_{sn}$ | $Y_{sn}$ | $X_{en}$ | $Y_{en}$ | X off n | Y off n |

Fig.12 (c)

storage format for second image memory

| line number | image data |
|---|---|
| 0 | $d_{00}$ $d_{10}$ $d_{20}$ ⋯ $d_{n0}$ |
| 1 | $d_{01}$ $d_{11}$ $d_{21}$ ⋯ $d_{n1}$ |
| 2 | $d_{02}$ $d_{12}$ $d_{22}$ ⋯ $d_{n2}$ |
| ⋮ | ⋮ |
| N | $d_{0n}$ $d_{1n}$ $d_{2n}$ ⋯ $d_{nn}$ |

Fig.14

| line number | R image data | G image data | B image data |
|---|---|---|---|
| 0 | Rd$_{00}$ Rd$_{10}$ Rd$_{20}$ ... Rd$_{n0}$ | Gd$_{00}$ Gd$_{10}$ Gd$_{20}$ ... Gd$_{n0}$ | Bd$_{00}$ Bd$_{10}$ Bd$_{20}$ ... Bd$_{n0}$ |
| 1 | Rd$_{01}$ Rd$_{11}$ Rd$_{21}$ ... Rd$_{n1}$ | Gd$_{01}$ Gd$_{11}$ Gd$_{21}$ ... Gd$_{n1}$ | Bd$_{01}$ Bd$_{11}$ Bd$_{21}$ ... Bd$_{n1}$ |
| 2 | Rd$_{02}$ Rd$_{12}$ Rd$_{22}$ ... Rd$_{n2}$ | Gd$_{02}$ Gd$_{12}$ Gd$_{22}$ ... Gd$_{n2}$ | Bd$_{02}$ Bd$_{12}$ Bd$_{22}$ ... Bd$_{n2}$ |
| ... | ... | ... | ... |
| N | Rd$_{0n}$ Rd$_{1n}$ Rd$_{2n}$ ... Rd$_{nn}$ | Gd$_{0n}$ Gd$_{1n}$ Gd$_{2n}$ ... Gd$_{nn}$ | Bd$_{0n}$ Bd$_{1n}$ Bd$_{2n}$ ... Bd$_{nn}$ |

| storage address | storage data |
|---|---|
| C_ADRn(a) | D15 ⋯ D8  D7 ⋯ D0<br>RYa(7) ⋯ RYa(0)  BYa(7) ⋯ BYa(0)<br>R-Y data             B-Y data |
| ⋮ | ⋮ |
| C_ADRn(n) | RYn(7) ⋯ RYn(0)  BYn(7) ⋯ BYn(0) |
| ⋮ | ⋮ |

IMAGE PROCESSING APPARATUS

FIELD OF THE INVENTION

The present invention relates to an image processing apparatus for storing an image data read by scanning an original image in an image memory based on a scanning position corresponding to the image data. More particularly, the invention relates to an image processing apparatus capable of reading gradation image data or color image data, with a reduced memory costs.

BACKGROUND OF THE INVENTION

In a conventional hand-scanner that reads an original image by a manual free scanning on an original, a scanning position of a read-sensor on an original is sequentially detected and, based on the detected scanning position, an image data is stored in an image memory.

In the detection of a scanning position, however, if used an auxiliary equipment, such as a sheet with a reference grid printed thereon, and a tablet, will increase the costs, and, if used an encoder which is attached to wheels moving integrally with the read-sensor and generates pulse signals according to the rotations of the wheels, will cause a great cumulative position errors due to machine accuracy, slipping of the wheels and the like.

Japanese Patent Application No. 7-080568 proposes an image processing apparatus that prevents image connection errors due to position errors of a scanning position, and reduces image distortion of a plane image connected in an image memory, by detecting position errors from an image data in an overlapping scanning area (in which an overlapping scanning is performed) and image information of a stored data, and then storing an image data in an image memory, based on a scanning position after correcting the detected position error.

This image processing apparatus, however, requires 4 M-bytes in reading gradation image data of 8-dot pixel when the storage capacity of the image memory is 8 pixels/mm, and it requires 12 M-bytes in reading color image data, thereby increasing the memory costs.

SUMMARY OF THE INVENTION

It is an object of the present invention to provide an image processing apparatus capable of reading gradation image data or color image data, with a reduced memory costs.

Other objects and advantages of the present invention will become apparent from the detailed description given hereinafter; it should be understood, however, that the detailed description and specific embodiment are given by way of illustration only, since various changes and modifications within the scope of the invention will become apparent to the those skilled in the art from this detailed description.

According to one aspect of the invention, by connecting correction information storing means to an exterior computer, such as a personal computer, and then utilizing the personal computer as a second image storing means, it is possible that correction information is read from the correction information storing means and M value gradation image data is read from the second image storing means, to reproduce the read M value gradation image in a state where position errors at connection part has been corrected. In addition, since image data having N value smaller than M value is stored in a first image storing means that is required to be installed as an inner memory, it is possible to suppress the storage capacity of the first image storing means. As a result, the invention provides an image processing apparatus capable of reading gradation image with a reduced memory costs of storing means.

According to another aspect of the invention, since means for making N value performs binarization processing, it is possible to decrease storage capacity of a first image storing means as much as possible, thus enabling reduced storing means costs as much as possible.

According to another aspect of the invention, it is possible that correction information is read from the correction information storing means and a plurality of image data are read from the second image storing means, to reproduce the read color image in a state where position errors at connection part has been corrected. In addition, since N value smaller than M value image data is stored in a first image storing means that is required to be installed as an inner memory, it is possible to suppress the storage capacity of the first image storing means. As a result, the invention provides an image processing apparatus capable of reading color images with a reduced memory cost of storing means.

According to another aspect of the invention, it is possible to provide an image processing apparatus capable of reading color images without monochromating processing, thus leading to a reduced costs of storing means.

According to another aspect of the invention, it is possible to provide an image processing apparatus capable of reading red, green and blue image data, with a reduced storing means costs.

According to another aspect of the invention, it is possible to provide an image processing apparatus capable of reading colors, with a reduced manufacture steps of a line image sensor and a reduced manufacture costs.

According to another aspect of the invention, correction information may be stored at intervals of reading, thus simplifying a storage format for correction information storing means.

According to another aspect of the invention, even in color image, it is possible to obtain composite image in which position errors have been corrected by the same operation amount as in monochromatic image, thereby providing an image processing apparatus capable of reading colors with simplified circuits and a reduced manufacture costs.

According to another aspect of the invention, it is possible to decrease storing means capacity while suppressing visual deterioration of image quality, thereby providing an image processing apparatus capable of reading colors with a further reduced manufacture costs.

According to another aspect of the invention, it is possible to decrease operation amount for generating gradation image data and chromatic image data from color image data, thereby providing an image processing apparatus capable of reading colors with a still further reduced manufacture costs.

According to another aspect of the invention, a construction of storing means can be simplified.

BRIEF DESCRIPTION OF THE DRAWINGS

FIGS. 12(a) is a diagram illustrating a relationship between a line number and an image data in the image processing apparatus in FIG. 1; FIG. 12(b) is a diagram showing a storage format for a correction information memory; and FIG. 12(c) is a diagram showing a storage format for a second image memory.

FIG. 14 is a diagram illustrating a storage format for the second image memory in the image processing apparatus in FIG. 13.

FIG. 18(a) illustrates a stored state of Y data in the first image memory; FIG. 18(b) illustrates a stored state of R-Y data in the second image memory, and FIG. 18(c) illustrated a store state of B-Y data in the second image memory.

DESCRIPTION OF THE PREFERRED EMBODIMENTS

Embodiment 1

Figure 1:
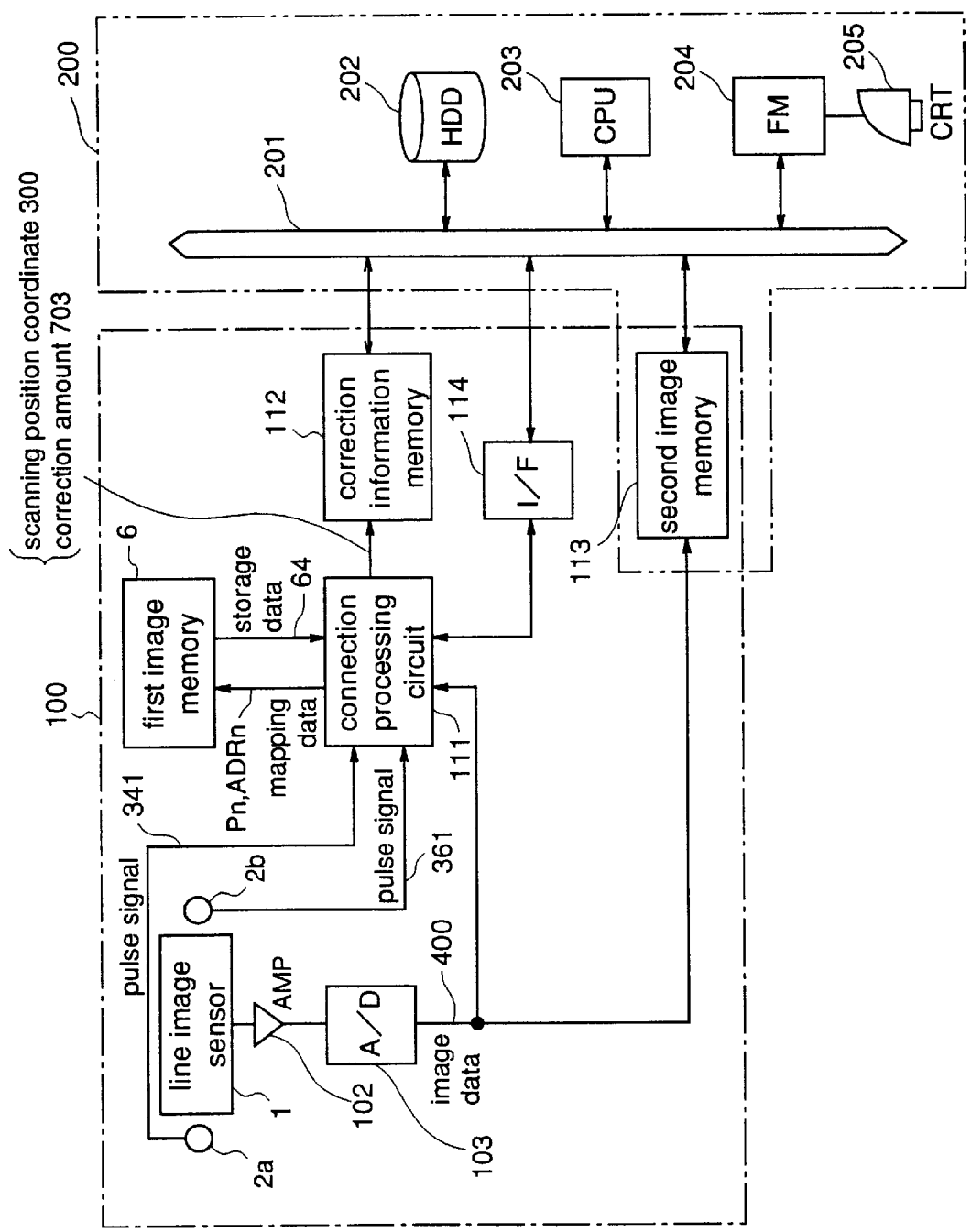
FIG. 1 is a block diagram showing a construction of an image processing apparatus according to a first embodiment of this invention.

FIG. 1 is a block diagram showing a construction of an image processing apparatus according to a first embodiment. In this embodiment, an image processing apparatus 100 is connected to a personal computer 200 comprising a CPU 203 connected to a bus 201, a hard disk drive 202 for driving the CPU 203 connected to the bus 201, a frame memory 204 for storing a display of the CRT 205, and a main memory 113 connected to the bus 201.

The image processing apparatus 100 comprises a line image sensor 1, encoders 2a, 2b, an amplifier 102, an A/D converter circuit 103, a connection processing circuit 111, a correction information memory 112, an interface 114, a first image memory 6, and the second image memory 113. The line image sensor 1 scans on an original to read a gradation image data 400 of the original at predetermined intervals (per line) The encoders 2a, 2b are integral with the line image sensor 1, and send pulse signals 341 and 361. The amplifier 102 amplifies the gradation image data 400 read by the line image sensor 1. The A/D converter circuit converts the amplified gradation image data 400 into a digital signal. The first image memory 6 stores a binarized image data. The connection processing circuit 111 binarizes the gradation image data 400 and detects a scanning position from the pulse signals 341a, 341b, 361a and 361b, not shown in FIG. 1) to detect a position error of the scanning position from a binarized image data Pn in an overlapping scanning area and a stored data 64, thereby storing the binarized image data Pn and ADRn (mapping data) into the first image memory (first image storing means) 6, based on a scanning position after correcting the detected position error. The correction information memory (correction information storing means) 112, which is connected to the bus 201, stores a scanning position and its position error correction value per line. The interface 114 connects the connection processing circuit 111 with the bus 201. The second image memory (second image storing means) 113 stores the gradation image data 400 per line, utilizing the main memory of the personal computer 200.

Figure 2:
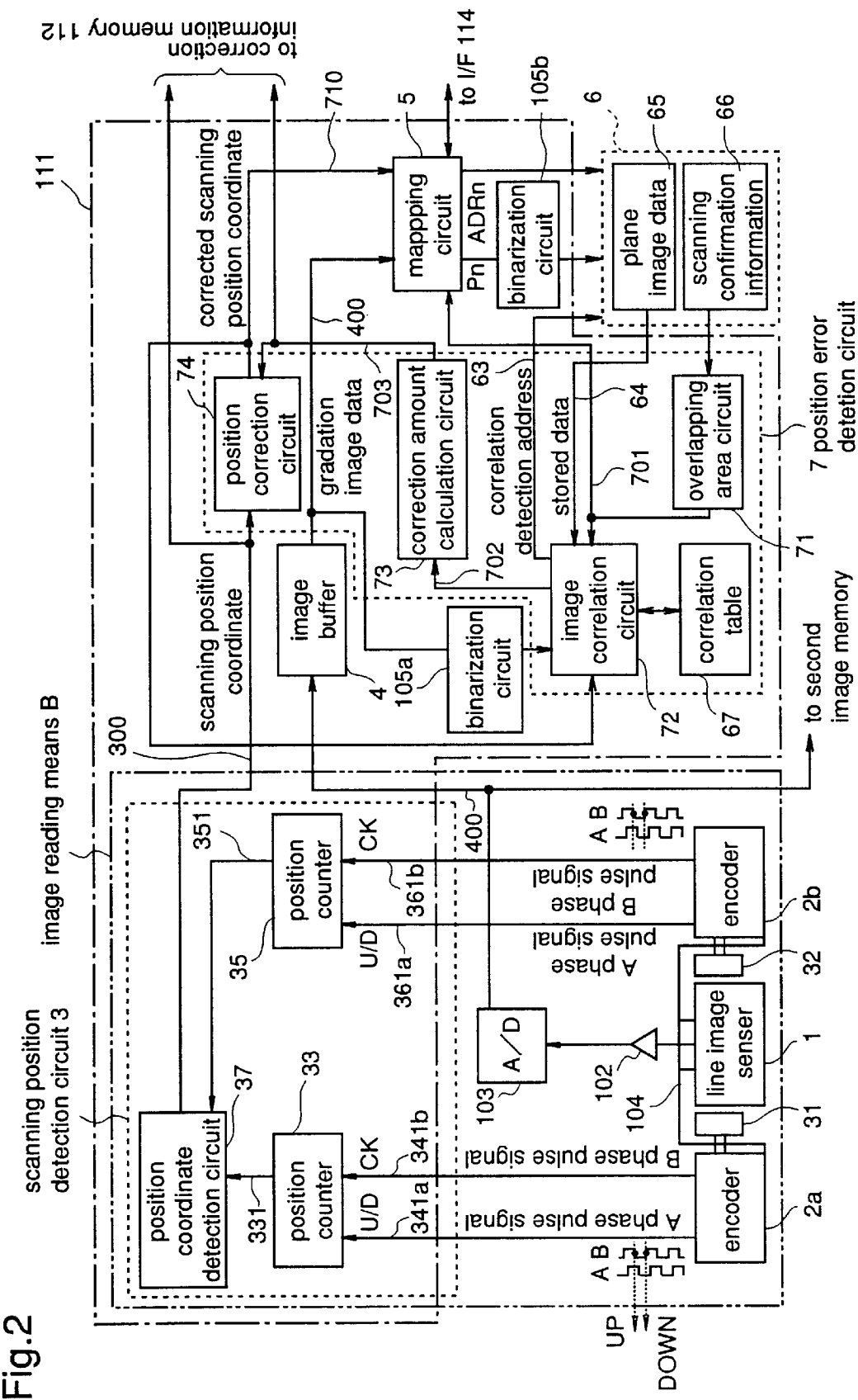
FIG. 2 is a block diagram showing a detailed construction of the image processing apparatus in FIG. 1.

FIG. 2 is a block diagram showing a detailed construction of the image processing apparatus 100 in FIG. 1. In FIG. 2, B designates an image reading means (hand-scanner). A frame 104 of a hand-scanner body is equipped with the line image sensor 1 and two wheels 31, 32 on both sides of the sensor 1. The wheels 31 and 32 are equipped with the encoders 2a and 2b, respectively. The connection processing circuit 111 comprises a scanning position detection circuit 3, an image buffer 4, a mapping circuit 5, a position error detection circuit 7, and binarization circuits 105a, 105b.

The scanning position detection circuit 3 is provided with position counters 33, 35 that detect travel distances 331, 351 of the wheels 31, 32 from the pulse signals 341a, 341b, 361a, 361b input from the encoders 2a, 2b, respectively; and a position coordinate detection circuit 37 that detects a scanning position coordinate 300 from the travel distances 331, 351.

The image buffer 4 stores temporarily the gradation image data 400. The binarization circuit 105a binarizes the gradation image data 400.

The position error detection circuit 7 is provided with a correlation table 67; an overlapping area circuit 71 that detects an overlapping scanning area; an image correlation circuit 72 for obtaining an offset value 702 that corrects a position error by using the correlation table 67, based on the binarized image data of the overlapping scanning area and the stored data 64; a correction amount calculation circuit 73 that calculates a correction amount 703 of the scanning position from the offset value 702; and a position correction circuit 74 that corrects the scanning position coordinate 300 based on the correction amount 703.

The mapping circuit 5 converts a corrected scanning position coordinate into a storage address ADRn, and then stores the gradation image data 400 as a storage data Pn, in a storage address corresponding to the storage address ADRn in the first image memory 6.

The binarization circuit 105b binarizes the storage data Pn. Numeral numbers 65, 66 designate storage areas of a plane image data and a scanning confirmation information, respectively (hereinafter referred to as memory 65 and memory 66).

Description will be given of a detailed description of the aforesaid circuits.

The encoders 2a, 2b generate two-phase pulse signals: A-phase pulse signals 341a, 361a; and B-phase pulse signals 341b, 361b, which differ in phase by 90 degrees depending on turning angles of the wheels 31, 32. The turning directions of the wheels are detected utilizing the A-phase pulse signals 341a, 361a, and the B-phase pulse signals 341b and 361b. Due to 90 degrees difference between the A- and B-phase pulse signals, the A-phase pulse signals 341a and 361a which are detected by the rises of the B-phase pulse signals 341b and 361b, are identified as "H" or "L" level, depending on the turning directions of the wheels 31, 32. Assuming that the "L" level of the identified signals 341a, 361a is the forward direction (upward), and the "H" level is the backward direction (downward). According to the number of the B-phase pulse signals, the position counters 33, 35 increase the count values when the pulse signals 341a and 361a are the "L" level, and decrease the count values when both are "H" level. To the position coordinate detection circuit 37, count values 331, 351 from the position counters 33, 35, are input to detect travel distances of the wheels 31, 32 in consideration of the turning directions of the wheels 31, 32.

Figure 3:
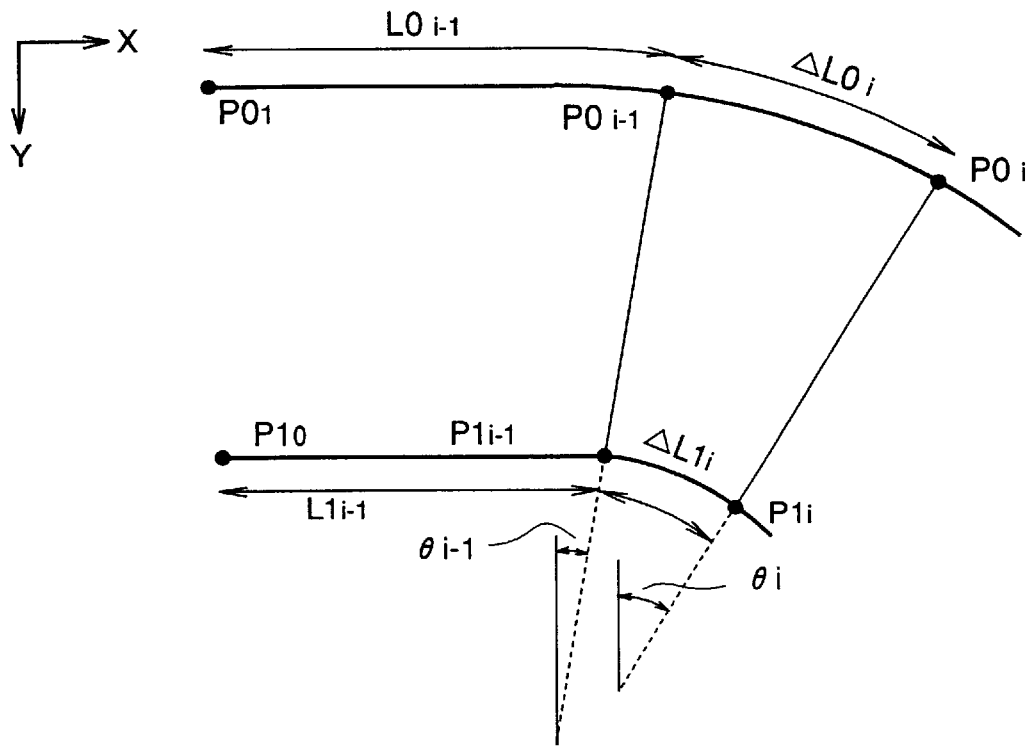
FIG. 3 is a diagram illustrating an operation of a scanning position detection circuit in FIG. 2.

Description will be given of the scanning position detection circuit 3. FIG. 3 is a schematic view showing an operation of the scanning position detection circuit 3. In FIG. 3, thick lines show tracks of the two wheels 31, 32. Coordinates that indicates the positions of the wheels 31, 32 when the line image sensor 1 (FIG. 1) reads pixel data in the ith line, are expressed as $P0_i(X0_i, Y0_i)$ and $P1_i(X1_i, Y1_i)$, respectively. Here provided that coordinates of $P0_{i-1}$ and $P1_{i-1}$ are known, the coordinates of $P0_i$ and $P1_i$ are calculated approximately from the following equations:

$$\theta_{i-1}=(L0_{i-1}-L1_{i-1})/D$$

$$X0_i=X0_{i-1}+\Delta L0_i \cdot \cos\theta_{i-1}$$

$$Y0_i=Y0_{i-1}+\Delta L0_i \cdot \sin\theta_{i-1} \qquad (1)$$

$$X1_i=X0_i-D \cdot \sin\theta_{i-1}$$

$$Y1_i=Y0_i-D \cdot \cos\theta_{i-1}$$

wherein $L0_{i-1}$ is travel distances of the wheel 31, 32 in reading from the start line to the (i−1) line; $\Delta L0_i$ is travel distances of the wheels 31, 32 in reading from the (i−1) line to the i line; and D is a distance between the wheels 31 and 32. In these equations and elsewhere throughout this description, "·" is an operation of multiplication, and "/" is an operation of division. Since the travel distances are determined in consideration of the turning directions of the wheels 31, 32, the values can be negative.

The travel distances of the wheels 31, 32 on the original 9 is obtained by multiplying pulse number N of the encoders 2a, 2b shown in FIG. 2, and a resolution P per pulse (inch/one pulse). The position coordinate detection circuit 37 reads the count values 331, 351 of the position counters 33, 35 in synchronization with the reading period of the line image sensor 1, and detects the travel distance $\Delta L0_i$ on the original 9, including the turning directions of the wheels 31, 32, based on a difference between the count values detected at the ith line and the (i−1) line. The equation (1) is an approximate calculation, assuming that:

$$\Delta\theta=|\theta_i-\theta_{i-1}|=|\Delta L0_i-\Delta L1_i|/D=0$$

wherein $\Delta\theta$ is a variable angle of the line image sensor 1 in scanning one line.

Using the equation (1), once coordinates of the two wheels 31, 32 at the time of reading are decided, it becomes possible to calculate their coordinates from the travel distances of the wheels 31, 32.

Figure 4:
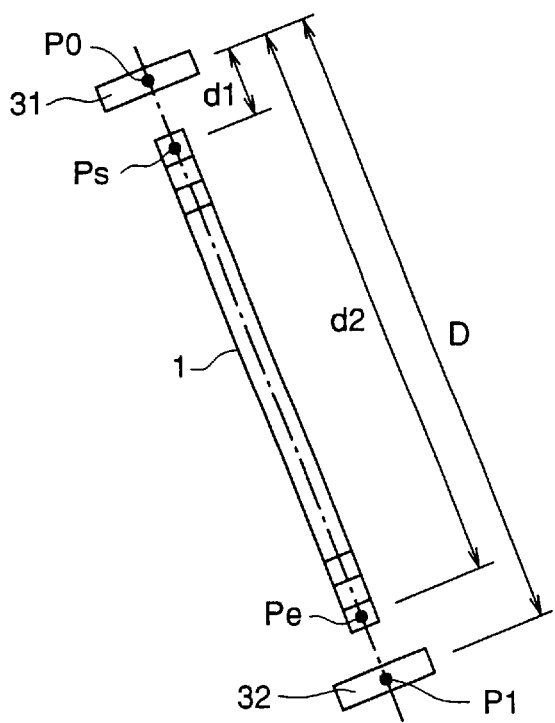
FIG. 4 is a diagram illustrating a calculation of a coordinate of end pixels in a line image sensor in FIG. 2

FIG. 4 is a diagram for explaining a coordinate calculation of reading pixels at both ends of the line image sensor 1. Assuming that a coordinate of the wheel 31 is P0(X0, Y0), and that of the wheel 32 is P1(X1, Y1). Coordinates Ps(Xs, Ys) and Pe(Xe, Ye) of pixels disposed at both ends of the line image sensor 1 are obtained from the following equation:

$$Xs=X0+(X1-X0)\cdot d1/D$$

$$Ys=Y0+(Y1-Y0)\cdot d1/D$$

$$Xe=X0+(X1-X0)\cdot d2/D \qquad (2)$$

$$Ye=Y0+(Y1-Y0)\cdot d2/D$$

where D is a distance between the wheels 31 and 32; d1 is a distance from the wheel 31 to the reading pixel Ps; and d2 is a distance from the wheel 31 to the reading pixel Pe.

The scanning position detection circuit 3 performs the operations of the equations (1) and (2) by using the travel distances of the wheels 31, 32 obtained from the two-phase pulses generated by the encoders 2a, 2b, and the outputs the coordinates Ps(Xs, Ys) and Pe(Xe, Ye) of the reading pixels at both ends of the line image sensor 1 to the position error detection circuit 7 as a scanning position coordinate 300.

Figure 5:
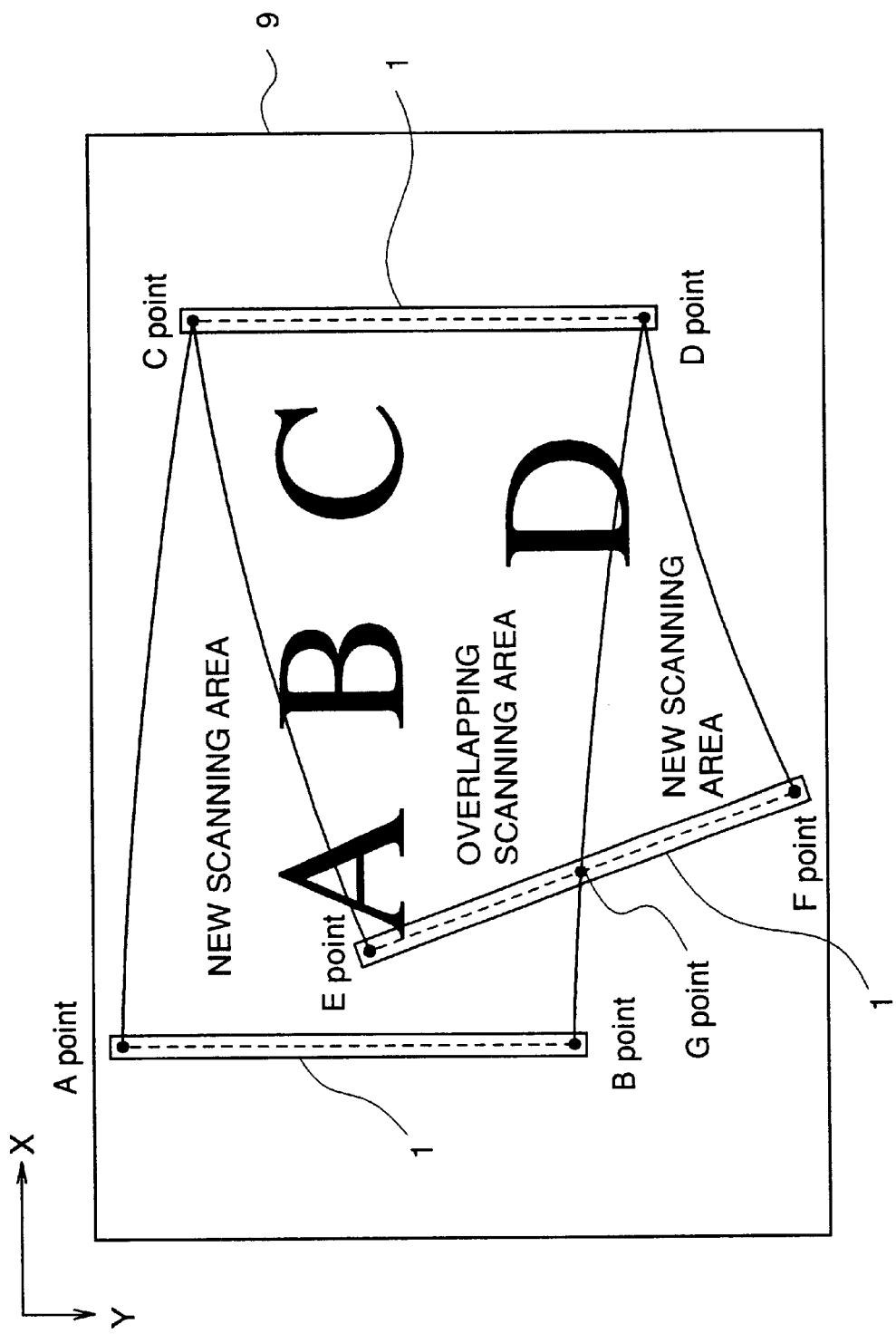
FIG. 5 is a diagram illustrating scanning areas of the line image sensor.

Referring to FIG. 5 showing scanning areas of the line image sensor 1, there will be described a move of the line image sensor 1 with a manual scanning when a reading area of an original 9 is wider than the length of the line image sensor 1. To read the original 9, an operator brings the main body of a hand-scanner into contact with the original 9 and perform a manual scanning while reciprocating it on the surface of the original 9. At this time, two wheels 31, 32 in the main body of the hand-scanner turn and then two-phase pulses are output from the encoders 2a, 2b.

Since the line image sensor 1 cannot scan the breadth extreme of the original 9, the image reading means B (FIG. 2) reads the entire original 9 by reciprocating the line image sensor 1. Although only positions of both pixels in the line image sensor 1 are shown in FIG. 5, the line image sensor 1 reads images present on a line linking both end pixels. For example, if both end pixels in the line image sensor 1 are expressed as A-point and B-point, respectively, the line image sensor 1 reads images on the line linking A point with B point (hereinafter referred to as "reading position A-B")

In FIG. 5, the line image sensor 1 scans from the reading position A-B to a reading position C-D. Data corresponding to a pixel (hereinafter referred to as "pixel data") in image data obtained by reading an area ABDC surrounded by A-point, B-point, D-point and C-point, is stored newly into a first image memory 6 by the mapping circuit 5 (FIG. 2) based on the scanning position coordinate 300 output from a scanning position detection circuit 3 (FIG. 2). Hereinafter such an area is referred to as a "new scanning area."Then, the line image sensor 1 moves in the return direction and scans from the reading position C-D to a reading position E-F. An area CDGE surrounded by C-point, D-point, G-point and E-point Is one in which overlapping image reading is performed. Hereinafter this area is referred to as an "overlapping scanning area." An area DGF surrounded by D-point, G-point and F-point is a new scanning area.

Thus, there are present three areas: the overlapping scanning area CDGE; a new scanning area ABGEC; and the new scanning area DGF.

If the scanning position coordinate 300 has no position error, each pixel data of the reading image data can be mapped and then stored in the first image memory 6, based on the scanning position coordinate 300. In other words, even if the read image data of the overlapping scanning area CDGE is overwritten in the image memory 6, the read image in the image memory 6 has no discrepancy at the joint of the new scanning area ABGEC and the overlapping scanning area CDGE. The scanning position coordinate 300, however, contains position errors due to the influences of the structure design accuracy of a hand-scanner, slipping between the wheels 31,. 32 and the original 9, sinking of the wheels 31, 32 into the original 9, and a distance between the wheels 31 and 32 at the time of manual curve scanning.

Furthermore, since the scanning position detection circuit 3 obtains travel distances of the encoders 2a, 2b by counting the two-phase pulses being output from the encoders 2a, 2b, the aforesaid position error will be accumulated. Therefore, when the image data 400 is mapped to the first image memory 6 by using the scanning position coordinate 300, image discrepancy will occur at the aforesaid joint. It is noted that the term "map" means an operation of storing read image data into a predetermined address in the first image memory 6.

To avoid the image discrepancy, the position error detection circuit 7 calculates a correlation value that indicates correlation degrees between the image data of the overlapping scanning area CDGE stored in the first image memory 6 and the image data 400 being binarized. Based on the obtained correlation value, the position error detection circuit 7 calculates a position correction amount for correcting the scanning position coordinate 300, corrects the scanning position coordinate 300 according to the position correction amount, and outputs it to the mapping circuit 5 as a correction position coordinate 710.

According to the correction position coordinate 710, the mapping circuit 5 generates an address for mapping a pixel data of image data 400 into the first image memory 6, and stores the pixel data according to the address in the first image memory 6. An extraction of the overlapping scanning area CDGE will be described later.

Figure 6:
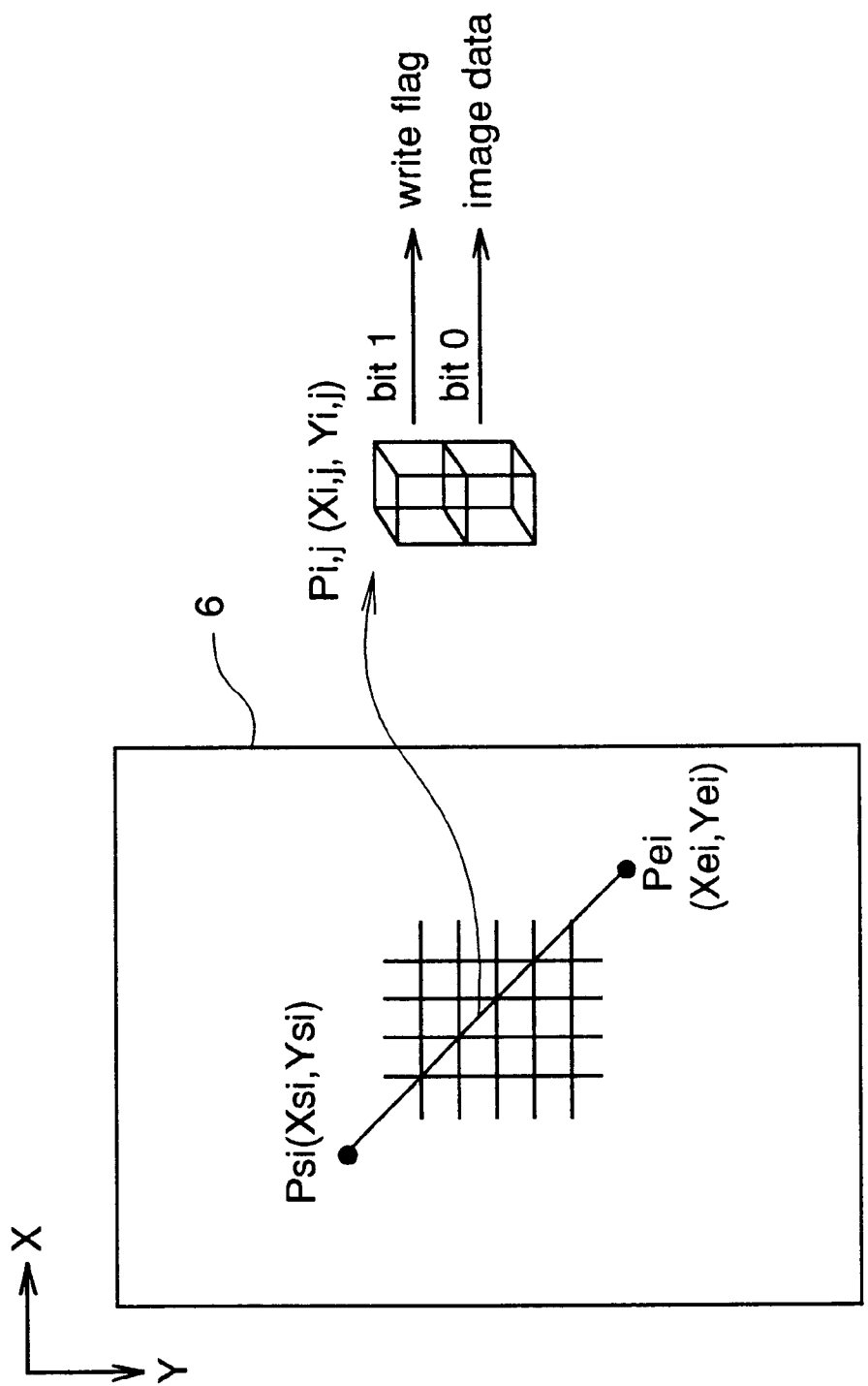
FIG. 6 is a diagram illustrating a first image memory in FIG. 2.

FIG. 6 is a diagram showing an image memory. Each pixel in the first image memory 6 comprises a write flag storage bit (bit 1) for holding scanning confirmation information and an image data storage bit (bit 0). In this invention, since the image memory stores a binarized image data, the first image memory 6 calls for only one bit per pixel, thus reducing the storage capacity of the first image memory 6.

The write flag (bit 1 is "0" when no image data is written in the first image memory 6, i.e., in a non-stored state, and the write flag is "1" when the image data is written, i.e., in a stored state. The storage bit (bit 1) of the write flag corresponds to a memory 66 and the storage bit (bit 0) of the image data corresponds to a memory 65.

An operation of the position error detection circuit 7 will be described.

Referring to FIG. 2, before the line image sensor 1 starts scanning, all the data in the first image memory 6, a position correction amount 703 in a correction amount calculation circuit 73, and a correlation table 67 are initialized to "0." After the initialization, whenever the line image sensor 1 scans a single line, the scanning position coordinate 300 is corrected by the position correction circuit 74, and the corrected coordinate is then output to the mapping circuit 5 as a correction position coordinate 710. At a time when the line image sensor 1 starts scanning, the position correction amount 703 is "0", and therefore, the scanning position coordinate 300 and the correction position coordinate 710 have the same coordinate value.

The mapping circuit 5 densifies the image data 400 by pixel density conversion to generate high density image data. Then, using the correction position coordinate 710 to be input, the mapping circuit 5 calculates a storage address ADRn in the first image memory 6 for each pixel data Pn of the high density image data 500, and then stores the pixel data Pn in the first image memory 6 according to the storage address ADRn. At this time, gradation data in the pixel data Pn is binarized by a predetermined threshold value in the binarization circuit 105b (FIG. 2).

The image correlation circuit 72 generates a correlation address 63 of a target pixel data Pn at each correlation detection from the correction position coordinate 710, and reads the stored data 64 from the memory 65 of the first image memory 6 and scanning confirmation information corresponding to the stored data 64, from the memory 6, which are then output to the overlapping area detection circuit 71. An operation of the mapping circuit 5 will be described later.

The overlapping area detection circuit 71 checks a write flag (bit 1) of the pixel data Pn, and decides whether the image data is being stored in the address ADRn of the pixel data Pn. The write flag (bit 1) indicating "1" shows that an image data is stored in the address ADRn through the scanning of the line image sensor 1, therefore, it is decided that the pixel data Pn is in an overlapping scanning area. For the write flag (bit 1) indicating "0", it is decided that the pixel data Pn is in a new scanning area. The overlapping area detection circuit 71 outputs a decision signal 701 to the image correlation circuit 72 and the mapping circuit 5. The decision signal 701 is a signal that becomes "0" for the pixel data Pn in a new scanning area, and becomes "1" for the pixel data Pn in an overlapping scanning area.

The image correlation circuit 72 calculates a correlation value of the pixel data Pn when the decision signal 701 is "1", and no correlation value calculation is performed when it is "0". For "0", the mapping circuit 5 stores a high density pixel data Pn into the first image memory 6, and for "1", no data Pn is stored into the first image memory 6. A series of this processing per pixel unit is performed for all the pixel data in one line of the high density image data 500.

At the time when the foregoing process for the high density image data in one line is concluded, the image correlation circuit 72 detects a position error direction of the scanning position coordinate 300, by using a correlation table that is prepared by calculating correlation values of only pixels of the overlapping scanning area The image correlation circuit 72 outputs an offset value 702 for canceling a position error, to the correction amount calculation circuit 73 When the high density pixels in one line are all in the new scanning area, the correlation table of the image correlation circuit 72 remains the initial value of "0", so that the offset value 702 becomes "0" (no position error).

The correction amount calculation circuit 73 adds the offset value 702 to an accumulated value of correction amounts being held therein, and then outputs the result to a position correction circuit 74 as a position correction amount 703. The position correction circuit 74 adds the position correction amount 703 to the scanning position coordinate 300 for image data of the next line to be processed, and then outputs the result to the mapping circuit 5 as a correction position coordinate 710. Thereafter a series of the foregoing process is repeated subsequently per line.

Figure 7:
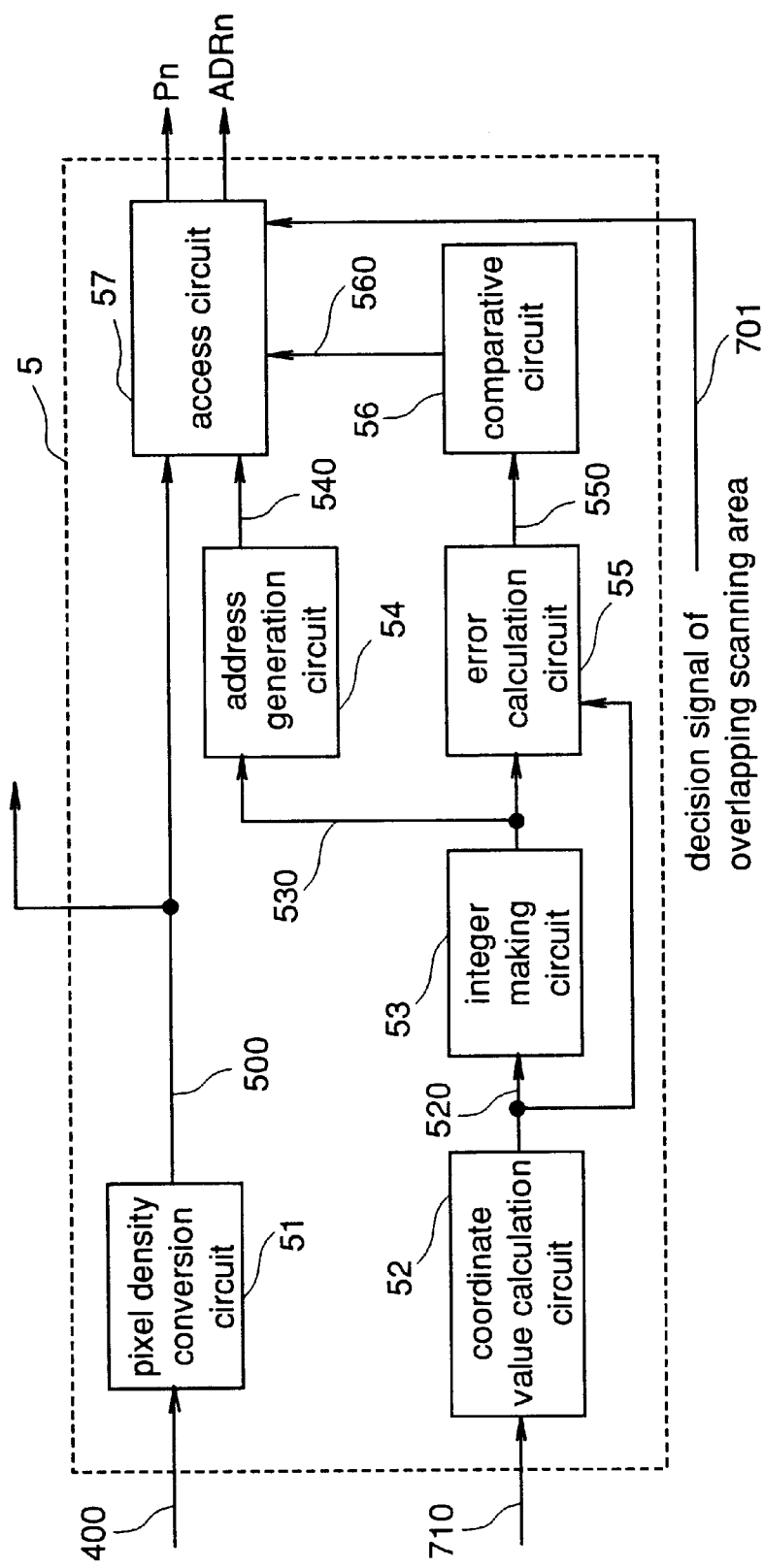
FIG. 7 is a diagram showing a construction of a mapping circuit in FIG. 2.
Figure 9:
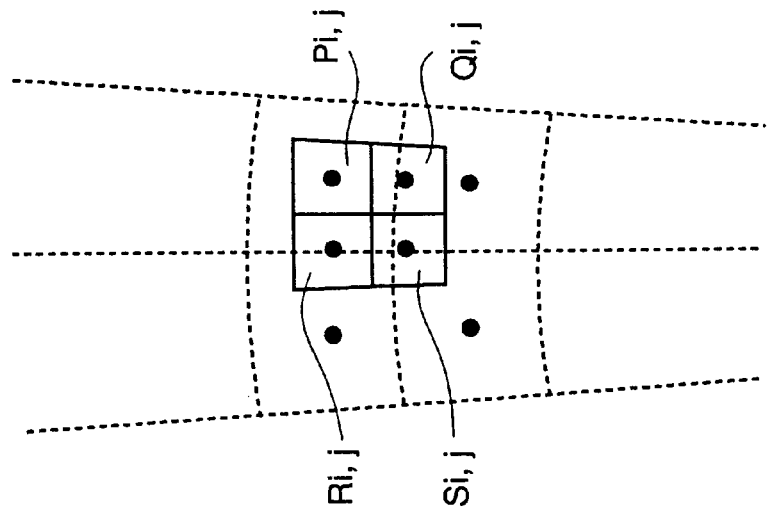
FIGS. 9(a) and 9(b) are diagrams illustrating pixel density conversion in the image processing apparatus in FIG. 1.
Figure 9:
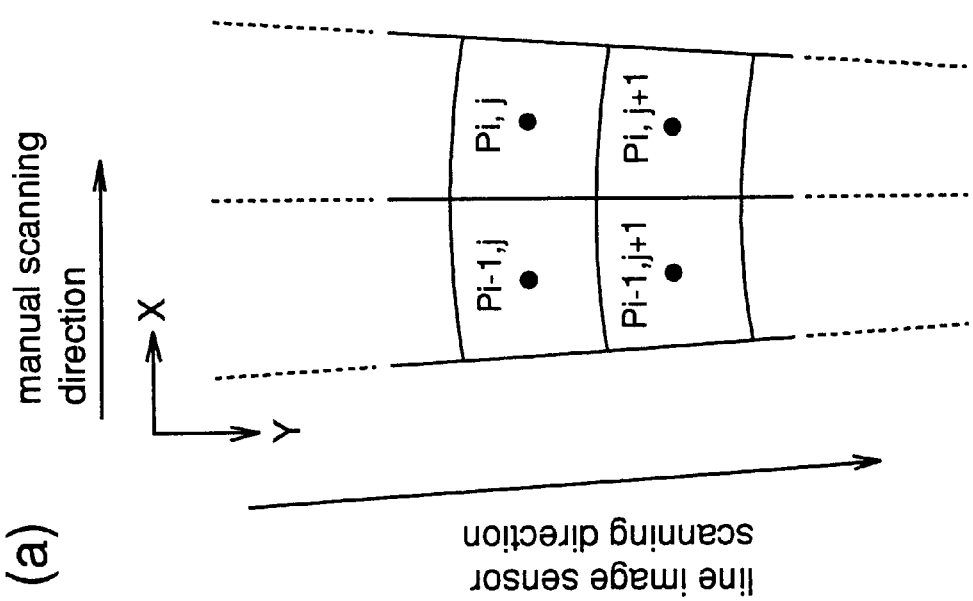

An operation of the mapping circuit 5 will be described referring to FIGS. 6, 7, 9(a) and 9(b). FIG. 7 is a block diagram showing a construction of the mapping circuit 5. FIGS. 9(a) and 9(b) are diagrams for explaining a pixel density conversion.

The mapping circuit 5 is provided with a pixel density conversion circuit 51, a coordinate value calculation circuit 52, an integer making circuit 53, an address generation circuit 54, an error calculation circuit 55, a comparison circuit 56 and an access circuit 57.

The pixel density conversion circuit 51 generates three interpolation pixels per pixel data in the gradation image data 400, and then outputs the high density image data 500 of two-fold densification.

A method of generating an interpolation pixel will be described referring to FIGS. 9(a) and 9(b), wherein $P_{i,j}$ is the jth pixel data of the ith line image data in the gradation image data 400. FIG. 9(a) shows four adjacent pixels in the gradation image data 400. In FIG. 9(b), $Q_{i,j}$, $R_{i,j}$ and $S_{i,j}$ are-interpolation pixel data for the pixel data $P_{i,j}$ in the image data 400. The interpolation pixel data $Q_{i,j}$, $R_{i,j}$ and $S_{i,j}$ are respectively obtained from the following equations:

$$Q_{i,j}=(P_{i,j}+P_{i,j+1})/2$$

$$R_{i,j}=(P_{i,j}+P_{i-1,j})/2 \quad (3)$$

$$S_{i,j}=(P_{i,j}+P_{i,j+1}+P_{i-1,j}+P_{i-1,j+1})/4$$

The coordinate value calculation circuit 52 will be described. As shown in FIG. 7, the correction position coordinate 710 which is a coordinate value after correcting both end pixels in the line image sensor 1, is input to the coordinate value calculation circuit 52. Using the correction position coordinate 710 to be input, the circuit 52 calculates a coordinate value 520 of each pixel in the high density image data 500.

Referring to FIG. 6, an operation of the coordinate value calculation circuit 52 will be described. In FIG. 6, coordinates (correction position coordinate 710) of both end pixels $Ps_i$ and $Pe_i$ in the line image sensor 1 are defined as $(Xs_i, Ys_i)$ and $(Xe_i, Ye_i)$, respectively. A suffix i indicates a correction position coordinate of the ith line in the gradation image data 400. Here, assuming that a reading pixel density of the line image sensor 1 is 8 pixels/mm, and a pixel density of an image to be stored in the first image memory 6 is 8 pixels/mm. It is noted that $Xs_i$, $Ys_i$, $Xe_i$ and $Ye_i$ are real values in ⅛ mm.

A coordinate $(XP_{i,j}, YP_{i,j})$ of a pixel data $P_{i,j}$ is obtained from the following equations:

$$XP_{i,j}=Xs_i+j\cdot(Xe_i-Xs_i)/(Nd-1)$$

$$YP_{i,j}=Ys_i+j\cdot(Ye_i-Ys_i)/(Nd-1) \quad (4)$$

wherein Nd is the number of pixels being read in one line by the line image sensor 1; and j is a pixel number in one line.

Coordinates $(XQ_{i,j}, YQ_{i,j})$, $(XR_{i,j}, YR_{i,j})$ and $(XS_{i,j}, YS_{i,j})$ of three interpolation pixel data of $Q_{i,j}$, $R_{i,j}$ and $S_{i,j}$ which correspond to the pixel data $P_{i,j}$, are obtained from the following equations:

$$XQ_{i,j}=(XP_{i,j}+XP_{i,j+1})/2$$

$$YQ_{i,j}=(YP_{i,j}+YP_{i,j+1})/2$$

$$XR_{i,j}=(XP_{i,j}+XP_{i-1,j})/2 \quad (5)$$

$$YR_{i,j}=(YP_{i,j}+YP_{i-1,j})/2$$

$$XS_{i,j}=(XP_{i,j}+XP_{i,j+1}+XP_{i-1,j}+XP_{i-1,j+1})/4$$

$$YS_{i,j}=(YP_{i,j}+YP_{i,j+1}+YP_{i-1,j}+YP_{i-1,j+1})/4$$

The coordinate value calculation circuit 52 calculates a coordinate value 520 of each pixel in the high density image data 500, by performing the operations of the equations (4) and (5).

The integer making circuit 53 changes the coordinate value 520 being a real value into an integer, and then outputs an integer coordinate value 530. When the real coordinate value 520 is defined as $(X_{real}, Y_{real})$ and the integer coordinate value 530 is defined as $(X_{int}, Y_{int})$, an integer coordinate value is obtained from the following equations:

$$X_{int}=[X_{real}+0.5]$$

$$Y_{int}=[Y_{real}+0.5] \quad (6)$$

wherein [ ] is an operation of rounding-down a decimal point.

Figure 10:
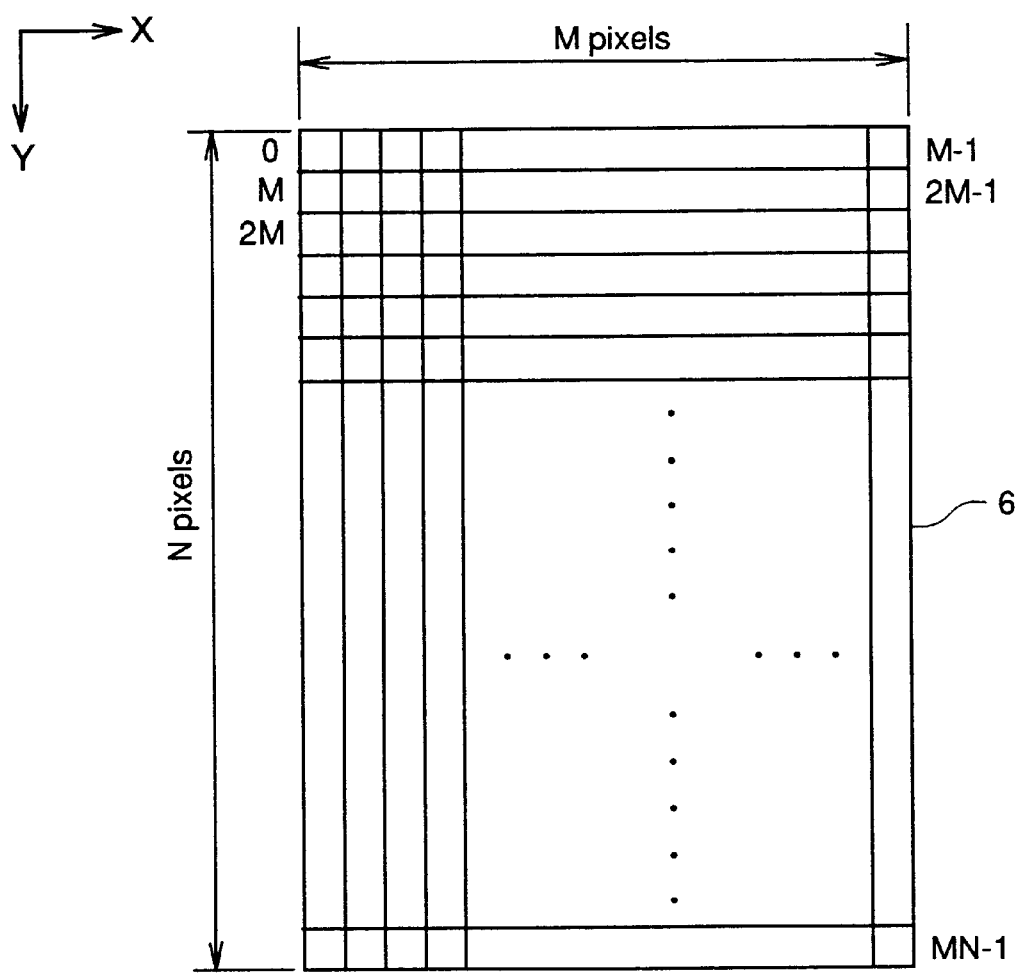
FIG. 10 is a diagram illustrating an address layout of the first image memory in FIG. 2

An address generation circuit 54 converts the integer coordinate value 530 output from the integer making circuit 53, to an address 540 in the first image memory 6. FIG. 10 shows an address layout in the first image memory 6, which is a page memory comprising M pixels in the X direction and N pixels in the Y direction. An address of a pixel in the upper left corner of the first image memory 6 is 0, that of a pixel in the upper right corner is (M−1), and that of a pixel in the lower right corner is (MN−1). Defining the integer coordinate value 530 as $(X_{int}, Y_{int})$, an address ADR in the first image memory 6 is obtained from the following equation:

$$ADR=X_{int}+M\cdot Y_{int} \quad (7)$$

The real coordinate value 520 and the integer coordinate value 530 are input to an error calculation circuit 55, from which then a coordinate error 550 caused in changing the real coordinate value into an integer is output to a comparison circuit 56. Defining coordinate errors in the X and Y directions as Ex and Ey, respectively, a coordinate error (Ex, Ey) is obtained from the following equations:

$$Ex=|X_{real}-X_{int}|$$

$$Ey=|Y_{real}-Y_{int}| \quad (8)$$

wherein | | is an operation for obtaining an absolute value; and Ex and Ey are in the range of 0–0.5. Hereinafter, | | means the same operation.

The comparison circuit 56 compares the coordinate errors Ex and Ey with predetermined values, and then outputs a signal 560 that becomes "1" when Ex and Ey are both smaller than the predetermined values, to an access circuit 57.

Figure 11:
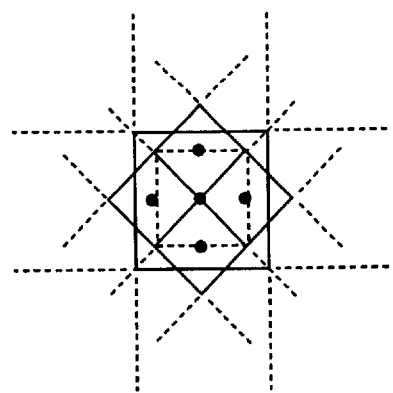
FIGS. 11(a) to 11(c) are diagrams illustrating a mapping of a high density image data into the first image memory in the image processing apparatus in FIG. 1.
Figure 11:
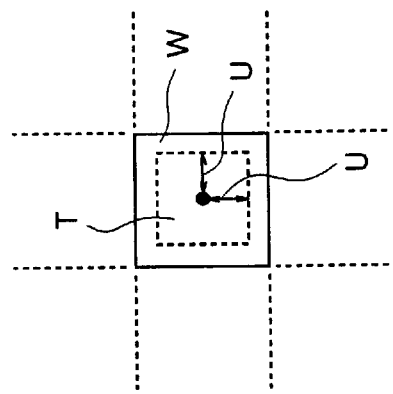
Figure 11:
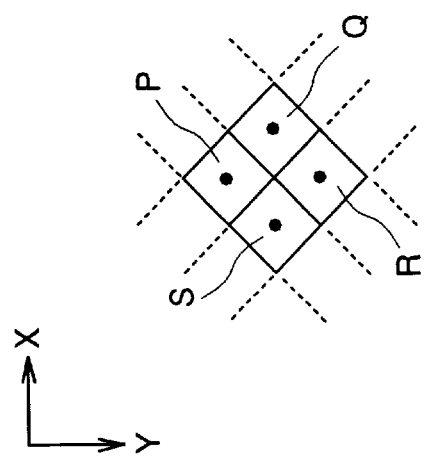

The access circuit 57 accesses the first image memory 6. An address in the first image memory 6 is designated by an address 540 that is output from the address generation circuit 54 to the access circuit 57. The high density image data 500 is stored in the first image memory 6 by the access circuit 57, only when the decision signal 701 is "0" and the signal 560 is "1". Specifically, an arbitrary pixel in the high density image data 500 is mapped into the first image memory 6 only when a pixel is in a new scanning area and both coordinate errors Ex and Ey are smaller than the above predetermined values. A pixel failing to satisfy this condition is not mapped into the first image memory 6. By performing a memory control under which a new image data is not stored in an area that is already stored in this first image memory 6, even if a scanning position including an accumulated position error is input, image data having less accumulated position error is preferentially stored in the first image memory 6 during sequential overlapping reading by manual reciprocating scanning of one-stroke, so that an image whose scanning position error is small is always stored in the first image memory 6. The use of such a storage data in position error detection enables to provide a connected composite image having less distortion, thereby improving plane image quality FIGS. 11(a) to 11(c) are diagrams illustrating a mapping of a high density image data into an image memory.

FIG. 11(a) shows the high density image data 500 wherein dots are coordinate values of pixels P, Q, R and S, respectively. The minimum pixel density of the high density image data 500 is 16 pixels/mm. FIG. 11(b) shows a pixel in the first image memory 6. In FIG. 11(b), a dot is a coordinate value of a pixel W. A distance U indicates a predetermined value used in the comparison circuit 56 of the mapping circuit 5. The first image memory 6 stores image data having a pixel density of 8 pixels/mm. FIG. 11(c) shows an example in which the high density image data 500 (FIG. 11(a)) and the pixel in the first image memory 6 (FIG. 11(b)) are superimposed on the same coordinate system. In FIG. 11(c), each coordinate value of the pixels P, Q, R and S in the high density image data 500 is present outside of an area T, so that none of the pixels: P, Q, R and S, are mapped into the pixel W in the first image memory 6. Specifically, in the first image memory 6 there exist pixels not to be mapped (non-mapped pixels), even in the original reading area. The non-mapped pixels can be eliminated by broadening the area T. However, if the area T is broadened, coordinate errors during mapping is increased, thus increasing distortion of images mapped into the first image memory 6. To avoid image distortion, the narrower area T is preferred.

A maximum value Umax of the distance U for preventing non-mapped pixels is defined by equation:

$$U_{max}=(\sqrt{2}/2)/2\approx 0.35 \quad (9)$$

Since in this embodiment the pixel density of the first image memory 6 is 8 pixels/mm, the unit is ⅛ mm. By setting the distance U to approximately 0.35, non-mapped pixels are avoidable. In cases where a reduction of image distortion is given priority while allowing non-mapped pixels to some degree, the distance U may be in the range of 0.3–0.35. If the distance U is not more than 0.3, non-mapped pixels occur so frequently that the image quality of a reproduced image deteriorates significantly.

Figure 8:
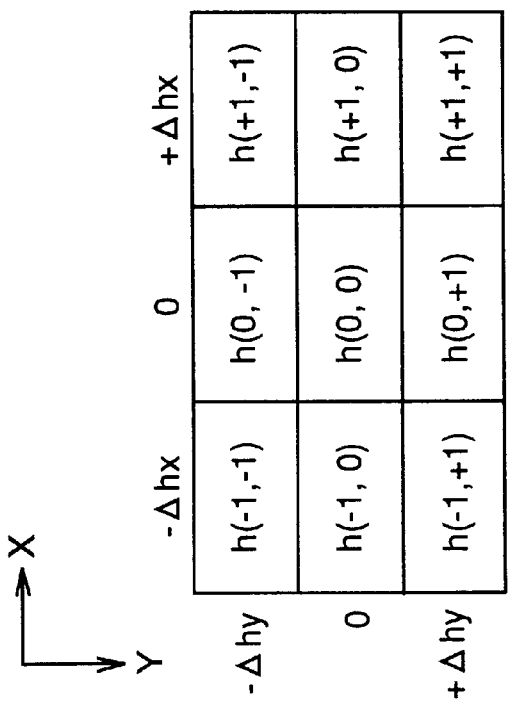
FIGS. 8(a) and 8(b) are diagrams illustrating a correlation table in FIG. 2.
Figure 8:
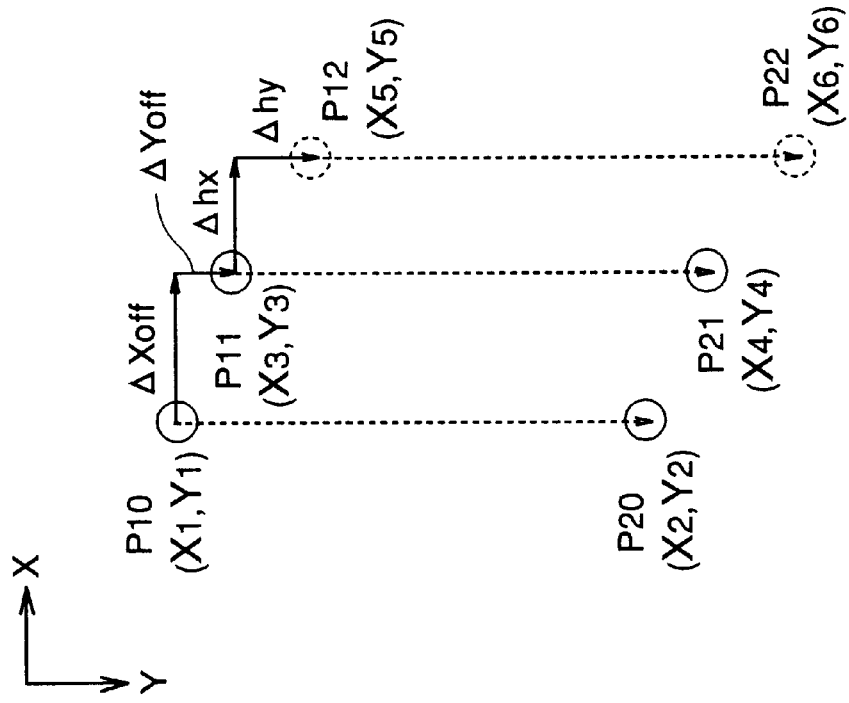

The operation of the position error detection circuit 7 shown in FIG. 2 will now be further discussed. FIGS. 8(a) and 8(b) are diagrams for explaining a correlation table 67. An image correlation circuit 72 will be described mainly referring to FIGS. 8(a) and 8(b). FIG. 8(a) illustrates a correlation position to be an object of correlation processing, and FIG. 8(b) illustrates a correlation table. Here, the scanning position coordinate 300 in the ith line to be input to the position correction circuit 74 is defined as P10(E1, Y1) and P20(X2, Y2), and the position correction amount 703 are defined as $\Delta$Xoffset$_i$ and $\Delta$Yoffset$_i$. Using the scanning position coordinate 300 and the position correction amount 703, the position correction circuit 74 calculates P11(X3, Y3) and P21(X4, Y4) of the correction position coordinate 710 from the following equations:

$$X3=X1+\Delta Xoffset_i$$

$$Y3=Y1+\Delta Yoffset_i$$

$$X4=X2+\Delta Xoffset_i \quad (10)$$

$$Y4=Y2+\Delta Xoffset_i$$

Only when a decision signal 701 from the overlapping area detection circuit 71 is "1" (i.e., only when a target pixel is in the overlapping scanning area), the image correlation circuit 72 calculates a correlation value of the target pixel and then renews the correlation table. The pixel Pn in the first image memory 6 which corresponds to the coordinate of the target pixel is employed as a target pixel. A correlation value is obtained by calculating a differential value between an image data in the first image memory 6 which corresponds to a coordinate having a value slightly different from the coordinate of a target pixel, and an image data of the target pixel.

Defining a coordinate of the target pixel Pn as (Xn, Yn) and defining changes in coordinate value as $\Delta$hx and $\Delta$hy, a coordinate (Xh$_{mn}$, Yh$_{mn}$) of a pixel data Ph serving as an object of a correlation value calculation of the target pixel is obtained from the following equations:

$$Xh=[Xn+\Delta hx\times m+0.51]$$

$$Yh=[Yn+\Delta hy\times n+0.51] \quad (11)$$

wherein m and n are −1, 0 or 1; and [ ] is as defined above

In FIG. 8(a), the arrow from P12 to P22 indicates the position of one line which calculates a correlation value with m=1 and n=1. By defining a value of a correlation table that corresponds to a coordinate serving as an object of the correlation value calculation, as h(m, n), the correlation table shown in FIG. 8(b) is obtained.

The value h(m, n) of each correlation table is calculated from the following equation:

$$h(m, n)=ho(m, n)+|Dn_j-Dh_{jmn}| \quad (12)$$

wherein ho(m, n) is the value of a correlation table generated by correlation value calculations up to a pixel number (j−1); j is a pixel number in the high density image data 500; Dn$_j$ is a data value; and Dh$_{jmn}$ is a pixel data in the first image memory 6, serving as an object of the correlation value calculation.

Prior to the correlation value calculation for one line, the values in the correlation table are all initialized to "0".

The image correlation circuit 72 conducts the aforesaid correlation value calculation for all pixels in one line of the high density image data 500 to complete a correlation table. A coordinate for which a correlation value calculation is made is a correction position coordinate 710 calculated from the equation (10).

At the time when the correlation value calculation for one line is completed, the image correlation circuit 72 retrieves (m$_{min}$, n$_{min}$) where m and n is −1, 0 or 1, having the minimum value of h(m, n), and then outputs it to the correction amount calculation circuit 73 as an offset value 702. If a plurality of minimum values are present in a correlation table and they include (m$_{min}$, n$_{min}$)=(0, 0), (0, 0) is preferentially employed. The fact that the correlation value h(m$_{min}$, n$_{min}$) in the correlation table is 0) is preferentially employed. The fact that the correlation value h(m$_{min}$, n$_{min}$) in the correlation table is the minimum shows that when a mapping is performed by adding a minute value, ($\Delta$hx×m$_{min}$, $\Delta$hy×n$_{min}$) to a coordinate of a pixel, an image in the first image memory 6 and an image in a mapping line correspond to each other best. If a plurality of minimum values are present and they include a center of a correlation window, the offset value 702 is set to "0". For example, in a correlation window of 3×3, its center is h(0, 0)

Using an offset value 702 of ($m_{min}$, $n_{min}$), the correction amount calculation circuit 73 performs operations of the following equations:

$$\Delta Xoffset_i = \Delta Xoffset_{i-1} + \Delta hx \times m_{min}$$

$$\Delta Yoffset_i = \Delta Yoffset_{i-1} + \Delta hy \times n_{min} \quad (13)$$

wherein the offset value 702 is defined as $\Delta X = \Delta hx \times m_{min}$, $\Delta Y = \Delta hy \times n_{min}$; and a suffix i is a position correction amount 703 at the time when a correlation table for the ith line of the high density image data 500 is completed.

The position correction circuit 74 corrects a scanning position coordinate 300 by adding ($\Delta Xoffset_i$, $\Delta Yoffset_i$) to the scanning position coordinate 300, and then outputs the result as a correction position coordinate 710.

Description will be given of a format for storing into a correction information memory 112 and a second image format for storing into the correction information memory 112; and FIG. 12(c) illustrates a format for storing into the second image memory 113.

Referring to FIG. 12(a), a reading of the line image sensor 1 (FIG. 1) is performed at predetermined intervals, which is synchronized with line synchronizing signals. Image data of the line number N is one being read at the Nth line from the start of reading (0 line).

Referring to FIG. 12(b), the correction information memory 112 is to store, per line, coordinates of both ends of the line image sensor 1 ($Xs_i$, $Ys_i$, $Xe_i$, $Ye_i$), wherein i is 1 to N, and position correction amounts $\Delta Xoffset_i$, $\Delta Yoffset_i$, corresponding to the coordinates, wherein i is 1 to N (hereinafter referred to as $Xoff_i$, $Yoff_i$).

Referring to FIG. 12(c), the second image memory 113 is to store, per line, gradation image data being digitalized by the number of bits N, $d_{0i}d_{1i}d_{2i} \ldots d_{ni}$, wherein i is 1 to N; and N is suitably selected depending on the number of gradations necessary to the gradation image data Description will be given of a reading operation of the image processing apparatus 100 so constructed, by referring to FIGS. 1 to 12(c).

When the reading means B is operated to make a scan as shown in FIG. 5, the line image sensor 1 outputs gradation image data of the original 9 at predetermined intervals (per line). The analog outputs are amplified in the amplifier 102, and then converted into a digitalized gradation image data 400 in the A/D converter 103. The digitalized gradation data 400 is stored in the second image memory 113 per line and also stored temporality in the image buffer 4.

The scanning position detection circuit 3 detects a scanning position coordinate 300 from the number of rotations of the wheels 31, 32 and then outputs it. The scanning position coordinate 300 is stored in the correction information memory 112 per line. The image buffer 4 outputs the corresponding gradation image data 400 in synchronization with the scanning position coordinate 300.

When the scanning position coordinate 300 being input sequentially is outside of an overlapping scanning area, the position error detection circuit 7 does not correct its position error, and, when it is in the overlapping scanning area, the circuit 7 corrects its position error and then outputs a corrected scanning position coordinate 710.

The mapping circuit 5 generates a memory address ADRn for each pixel data Pn in one scanning line, from the corrected scanning position coordinate 710, and then stores a pixel data Pn that is selected as a mapping target from the gradation image data 400, in the memory 65 of the first image memory 6 via the binarization circuit 105b. At the same time, scanning confirmation information is stored in the memory 66 of the first image memory 6.

The gradation image data 400 that is output from the image buffer 4 is binarized in the binarization circuit 105a. On the receipt of the binarized image data, the position error detection circuit 7 detects whether an image data is in an overlapping scanning area or not, based on scanning confirmation information read from the memory 66. When the image data is in the overlapping scanning area, the circuit 7 calculates a position correction amount 703 from and, based on the position correction amount 703, corrects the aforesaid scanning position coordinate 300. The position correction amount 703 ($Xoff_i$, $Yoff_i$) is stored in the correction information memory 112 so as to correspond to the scanning position coordinate 300.

Description will be given of operations of reading and reproducing of read image data by the personal computer 200.

Referring to FIGS. 1 and 12(a) to 12(c), to reproduce read image data, by the CPU 203, there are subsequently read per line number: image data of ($d_{0i}d_{1i}d_{2i} \ldots d_{ni}$) from the image memory 113; and coordinates ($Xs_i$, $Ys_i$, $Xe_i$, $Ye_i$) of both end pixels of the line image sensor 1 and position correction amounts ($Xoff_i$, $Yoff_i$) from the correction information memory 112. In the CPU 203, coordinates of pixels are calculated from the coordinates ($Xs_i$, $Ys_i$, $Xe_i$, $Ye_i$), and the obtained coordinates are then corrected by the position correction amounts ($Xoff_i$, $Yoff_i$). Then, the corrected pixel coordinates of the same line number are associated with the image data ($d_{0i}d_{1i}d_{2i} \ldots d_{ni}$) to reproduce a plane image data. Based on the plane image data, the CPU 203 configurates a screen, which is then output to the frame memory 204 in order, as a screen information. The frame memory 204 displays the image reproduced by the CPU 203 on a CRT 205, while temporality storing the screen information. The image reproduced in this way is gradation image in which position errors in image connections have been corrected.

Description will be given of storage capacities required in the first image memory 6, the second image memory 113 and the correction information memory 112.

The storage capacity required in the first image memory 6 is, due to the binarization, approximately 1 M-bytes (512 K-bytes for one scanning and 512 K-bytes for an overlapping scanning). On the other hand, the second image memory 113 requires for example 4 M-bytes, if the number of bits of the gradation image data 400 being digitized in the A/D converter circuit 103, is 8 bits. The storage capacity of the correction information memory 112 is a negligible amount.

Therefore, the storage capacity required in the first image memory 6 will be approximately one-fourth of that in the case where only the first image memory 6 is provided, without the second memory 113.

The storage capacity of 4 M-bytes required in the second image memory 113 can be sufficiently furnished by a main memory of a general personal computer. Accordingly, the feature that storage bits of the first image memory 6 is less than that of the second image memory 113, enables to reduce the storage capacity of the first image memory 6.

Thus in the first embodiment, the gradation image data 400 of the original 9 is read per line; the scanning position coordinate 300 corresponding to the gradation image data 400 is detected; the read gradation image data 400 is binarized when mapping image data into the first image memory 6; a position error of a scanning position is corrected by the binarized image data and the image data 64 stored in the first image memory 6; and provided are the correction information memory 112 for storing the scanning position coordinate 300 being detected per line and its position correction amount 703, and the second image memory 113 for storing the gradation image data being read per line. Therefore, by connecting the correction information memory 112 with an external computer, such as a personal computer, and utilizing a memory of the external computer as the second image memory 113, it is possible to read the scanning position coordinate 300 and its position correction amount 703 from the correction information memory 112, and to read the gradation image data 400 from the second image memory 113 This enables to reproduce the read gradation image in a state where position errors of connection parts therein have been corrected, also enables to suppress the storage capacity of the first image memory 6 that is required to be equipped, as an internal memory, thus providing an image processing apparatus capable of reading gradation images, with a reduced memory costs.

Moreover, the feature that the storage means such as the first image memory 6, the correction information memory 112, and the second image memory, is constructed by memory, enables to simplify the construction.

Embodiment 2

Figure 13:
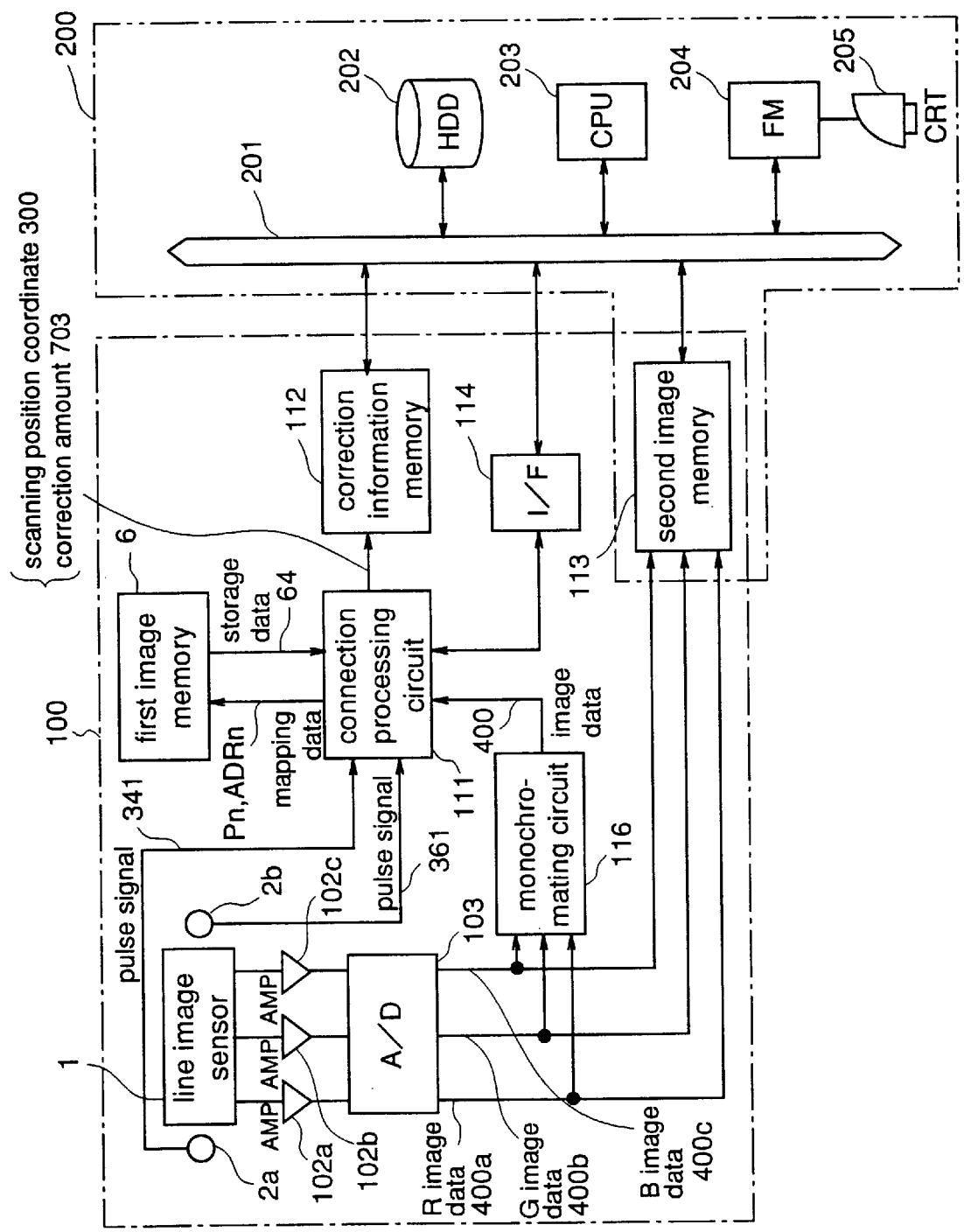
FIG. 13 is a block diagram showing a detailed construction of an image processing apparatus according to a second embodiment of this invention.

FIG. 13 is a block diagram showing a construction of an image processing apparatus according to a second embodiment. In FIG. 13, the same numeral number as in FIG. 1 designates the identical or corresponding one. Numeral number 116 designates a monochromating circuit.

This embodiment is the same as the first embodiment, except that a line image sensor 1 reads gradation data 400a, 400b, 400c of three primary colors of R (red), G (green) and B (blue): a second image memory 113 stores the data 400a, 400b and 400c; and the monochromating circuit 116 changes the data 400a, 400b and 400c and then input them to a connection processing circuit 11.

The conversion in the monochromating circuit 116 is executed by, for example, the equation:

$$Y = 0.30 \times R + 0.59 \times G + 0.11 \times B,$$

wherein Y is a monochromatic luminance data. To make hardware smaller, there may use an approximate equation: $Y = (R + 2G + B) \div 4$, so as to be executed by bit shift.

FIG. 14 is a diagram showing a format for storing into the second image memory 113 of FIG. 13. Per line number, R image data ($Rd_{0i} Rd1_i \ldots Rd_{ni}$), G image data ($Gd_{0i} Gd1_i \ldots Gd_{ni}$) and B image data ($Bd_{0i} Bd1_i \ldots Bd_{ni}$) are stored.

Figure 16:
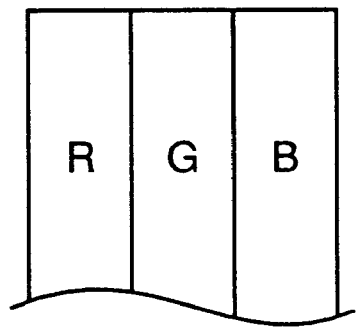
FIG. 16(a) is a top view illustrating a construction of a line image sensor in FIGS. 13 and 15.
FIGS. 16(b) and 16(c) are top views illustrating a construction of a line image sensor of other embodiments.
Figure 16:
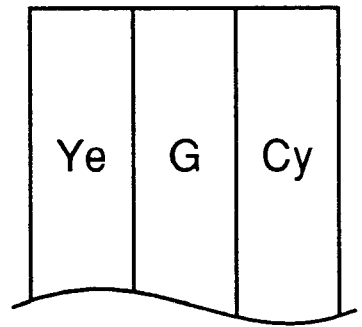
Figure 16:
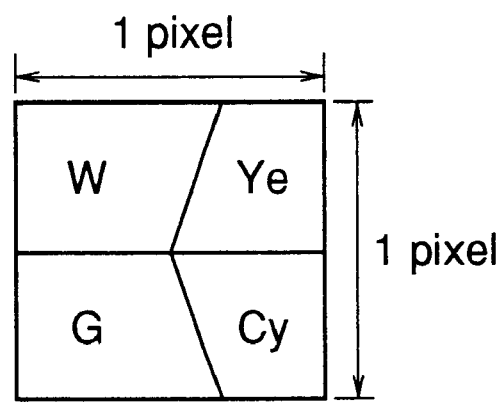

FIG. 16(a) is a top view illustrating a construction of the line image sensor 1 of FIG. 13. Detection areas of the primary colors R, G, B are provided in parallel in the width direction of the line image sensor 1. As shown in FIG. 4, each detection area comprises pixels disposed in a line longitudinally.

Thus in the image processing apparatus 100 so constructed in the second embodiment, the same processing as in the first embodiment is executed by the features that in a CPU 203, R image data ($Rd_{0i} Rd1_i \ldots Rd_{ni}$), G image data ($Gd_{0i} Gd1_i \ldots Gd_{ni}$) and B image data ($Bd_{0i} Bd1_i \ldots Bd_{ni}$) are read per line number from the second image memory 113, and coordinates of both end pixels of the line image sensor 1 are read per line from the correction information memory 112. It is therefore possible to display, on a CRT 205, a color image whose position errors in connection parts have been corrected.

The storage capacity of the second image memory 113 is 12 M-bytes if the number of bits of the gradation data 400a, 400b, 400c being digitized in an A/D converter circuit 103 is for example 8 bits.

Therefore, the storage capacity required in the first image memory 6 will be approximately one-twelfth of that in the case where only the first image memory 6 is provided, without the second memory 113. The storage capacity of 12 M-bytes required in the second image memory 113 can be sufficiently furnished by a main memory of a general personal computer.

Thus in the second embodiment, the line image sensor 1 reads gradation image data 400a, 400b, 400c of the three primary colors (R, G, B); the second image memory 113 stores the data 400a, 400b, 400c read per line; and the data 400a, 400b, 400c are monochromated and then input to the connection circuit 11. Therefore, by connecting the correction information memory 112 with an external computer, such as a personal computer, and utilizing a memory of the external computer as the second image memory 113, it is possible to read a scanning position coordinate 300 and its position correction amount 703 from the correction information memory 112, and to read the gradation image data 400 of the three primary colors (R, G, B) from the second image memory 113. This enables to reproduce the read gradation image of the three primary colors (R, G, B) in a state where position errors of connection parts therein have been corrected, also enables to suppress the storage capacity of the first image memory 6 that is required to be equipped as an internal memory, thus providing an image processing apparatus capable of reading color images, with a reduced memory costs.

Embodiment 3

Figure 15:
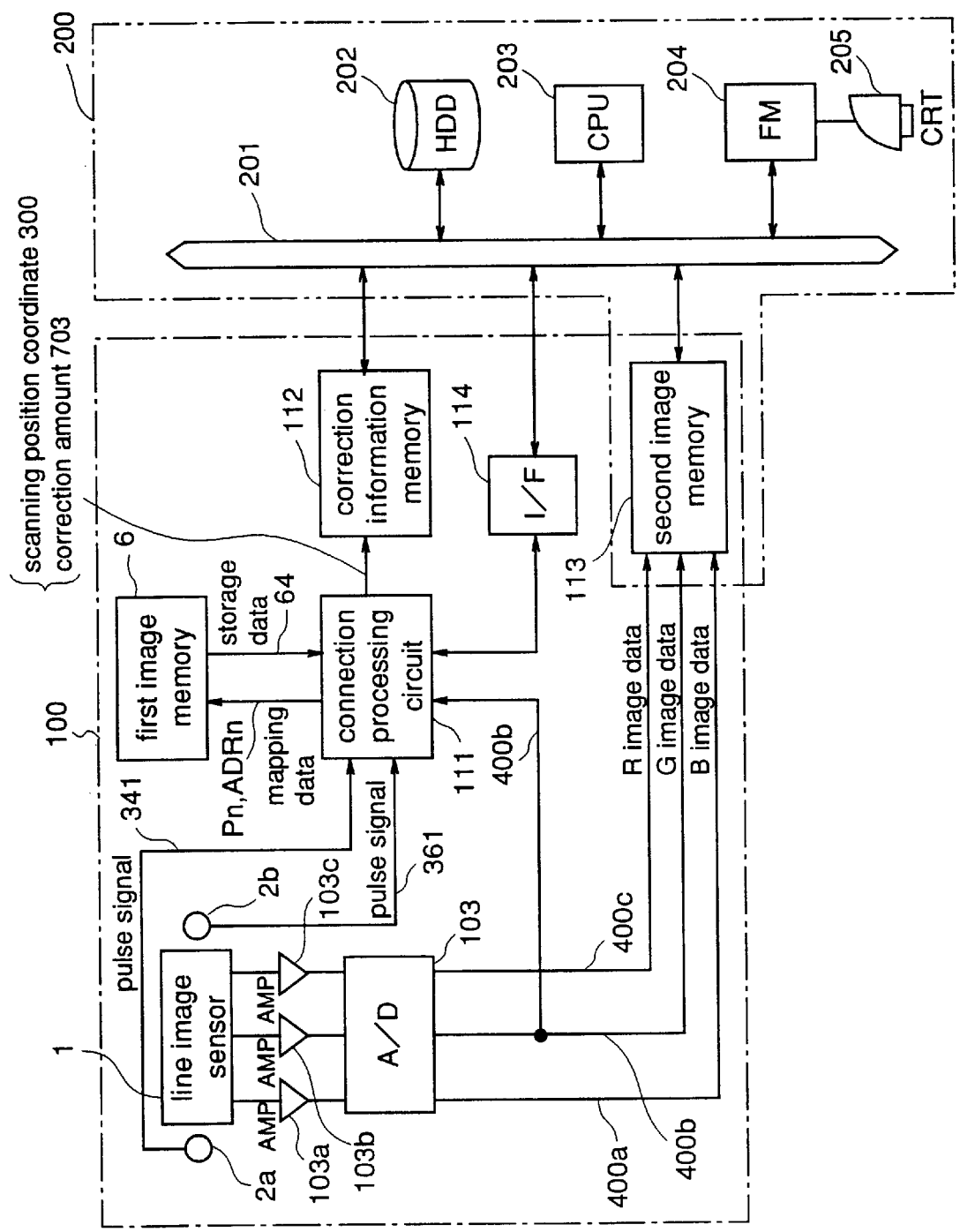
FIG. 15 is a block diagram showing a detailed construction of an image processing apparatus according to a third embodiment of this invention.

FIG. 15 is a block diagram showing a construction of an image processing apparatus according to a third embodiment. In FIG. 15, the same numeral number as in FIG. 13 designates the identical or corresponding one.

This embodiment is the same as the second embodiment, except that instead of monochromating three primary colors (R, G, B) gradation image data 400a, 400b, 400c and then inputting them in a connection processing circuit 111, the G image data 400b is input to the connection processing circuit 111.

Since the G image data 400b is similar to a gray gradation image, it requires no monochromating process. This leads to an image processing apparatus capable of reading color images, with a reduced memory costs.

Although in the second and third embodiments, R, C and B image data are employed as a color image data, cyan (Cy), green (G) and yellow (Ye) may be employed. In this case, detection areas of Cy, G and Ye are set in parallel in the width direction of the line image sensor 1, as shown in FIG. 16(b), and each detection area comprises pixel disposed longitudinally in a line as shown in FIG. 4. As a color spectroscopic filter comprising the detection areas, two types of those for Cy and Ye may be employed in order to reduce the manufacture steps, and the G detection area may be comprised of an overlapping area of the Cy spectroscopic filter and the Ye spectroscopic filter.

In FIGS. 13 and 15, Cy, G and Ye image data may be employed in place of the R, G and B image data. In this case, the storage format for the second image memory 113 in FIG. 14 will be one which corresponds to the Cy, G and Ye image data, and the G image data is input in the connection processing circuit 111 in FIG. 15, as in the third embodiment.

When employing the Cy, G and Ye image data, each pixel of the line image sensor 1 may be comprised of detection areas of Cy, G, Ye and W (white). In this case, the W image data is stored in the first image memory 6, and the Cy, G, Ye image data are stored in the second image memory 113.

As described above, to store one of plural color image data detected in the line image sensor 1 into the first image memory 6, enables to reduce the storage capacity of the first image memory 6.

Although in the second and third embodiments and other embodiments as described, the detection area of the line image sensor 1 is divided by the respective color detection areas of the plural color image data, there may be constructed that the detection area of the line image sensor 1 is not divided and light source irradiating the original 9 is subjected to time division so that each color of the plural color image data is emitted In order.

Furthermore, although in the first, second and third embodiments, the second image memory 113 stores the detected gradation image data; and the first image memory 6 binarizes the detected gradation image data, and then stores it, there may be so constructed that the second image memory 113 stores a detected M value gradation image data and the connection processing circuit 111 converts the detected M value gradation image data into image data of N value smaller than the M value, and then the first image memory 6 stores it. As a result, it is possible to reduce the storage capacity required in the first image memory 6, compared with the case where only the first image memory 6 is provided, without the second memory 113.

Embodiment 4

Figure 17:
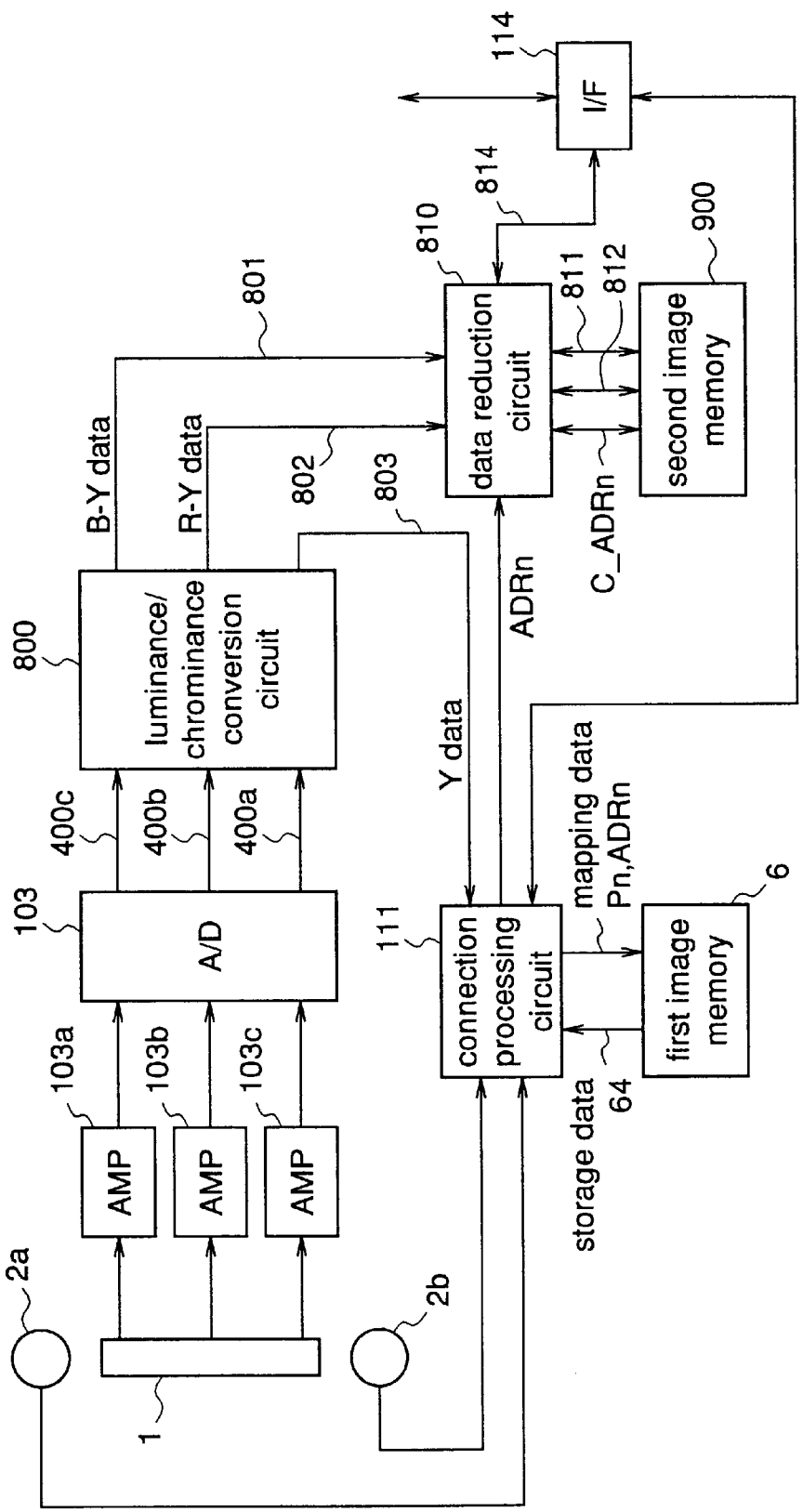
FIG. 17 is a block diagram showing a detailed construction of an image processing apparatus according to a fourth embodiment of this invention

FIG. 17 is a block diagram illustrating a detailed construction of an image processing apparatus according to a fourth embodiment of this invention. In FIG. 17, the same numeral number as in FIG. 13 designates the identical or corresponding one.

In the second embodiment, there has been described a construction in which correction information for connecting images is extracted from monochromatic image data and, based on the correction information, color image is connected and then composed. The fourth embodiment relates a construction in which processing of image data read by a hand-scanner is performed without the personal computer 200 as shown in FIG. 13. The fourth embodiment differs from the second embodiment in the following points.

In place of the second image memory 113 that stores image data so as to correspond to a line number; and the correction information memory 112 that stores a scanning position and its position error correction value so as to correspond to a line number, the fourth embodiment is provided with a second image memory 900 (a second image storing means) that stores image data so as to correspond to a scanning position after correcting position errors. In place of the monochromating circuit 116 that monochromates image data 400a, 400b, 400c of the three primary colors R, G, B, being read by the line image sensor 1, and then input them in the connection processing circuit 111, the fourth embodiment is provided with a luminance/chrominance conversion circuit 800 and a data reduction circuit 810.

The luminance/chrominance conversion circuit 800 converts the aforesaid image data 400a, 400b, 400c into a luminance (Y) data 803 (hereinafter referred to as "Y data"); a chrominance (R-Y) data 802 ("R-Y data"); and a chrominance (B-Y) data 801 ("B-Y data"), and then inputs the Y data 803 in the connection circuit 111.

The data reduction circuit 810 (chromatic image data reduction means, i.e., a second mapping means) reduces the R-Y data 801 and B-Y data 802 which have been converted in the luminance/chrominance conversion circuit 800, and then stores a reduced R-Y data 811 and B-Y data 812 into the second image memory 900 by using a storage address C_ADRn that is generated by reducing a storage address ADRn used in the mapping circuit 5 of the connection processing circuit 111 (i.e., the first mapping means, see FIG. 2). In the fourth embodiment, the binarization circuits 105a, 105b of the connection processing circuit 111 in FIG. 2 are omitted, and the Y data 803 is directly stored into the first image memory 6 by the number of gradation (in the fourth embodiment, e.g., 128 gradations). Even when the circuits 105a, 105b are omitted, the operation of connection processing of the connection processing circuit 111 are the same as in the first embodiment, except for an increase in storage capacity required in the first image memory 6.

The Y data to be stored in the first image memory 6 and the R-Y data and B-Y data stored in the second image memory 900, can be read, respectively, by using the connection processing circuit 111 and the data reduction circuit 810 through an interface 114 from the exterior.

Figure 18:
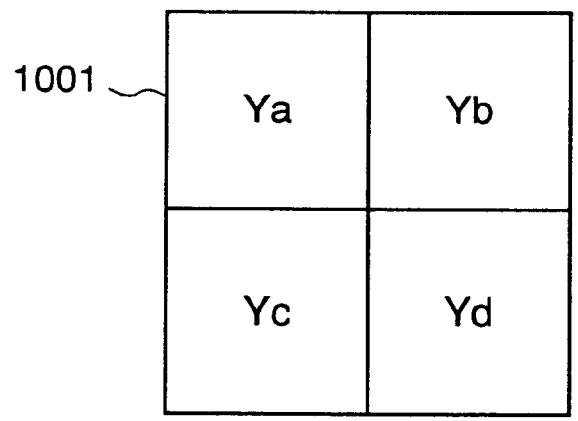
FIGS. 18(a) to 18(c) are diagrams for explaining processing for reducing R-Y data and B-Y data In a data reduction circuit in FIG. 17.
Figure 18:
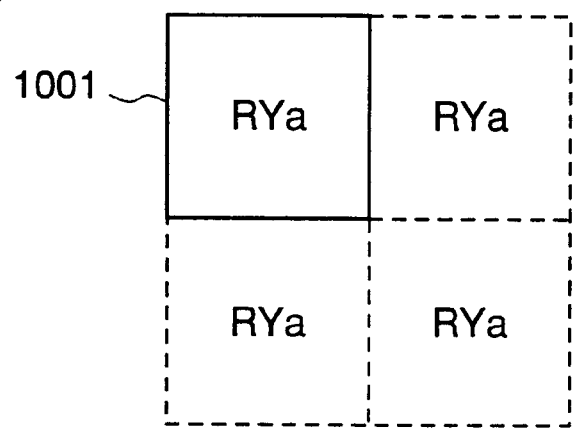
Figure 18:
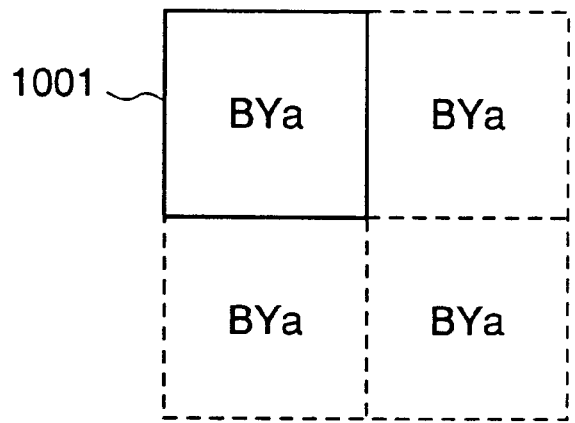

FIGS. 18(a) to 18(c) are diagrams for explaining a reduction processing of the R-Y data and B-Y data in the data reduction circuit 810; FIG. 18(a) illustrates a stored state of the Y-data in the first image memory 6; FIG. 18(b) illustrates a stored state of the R-Y data in the second image memory 900; and FIG. 18(c) illustrates a stored state of the B-Y data in the second image memory 900. In FIGS. 18(a) to 18(c), numeral number 1001 designates a unit storage area of an image memory (i.e., area to which image data corresponding to one pixel is stored); Ye to Yd are Y data stored in four unit storage areas 1001 in the first image memory 6; RYa is R-Y data that corresponds to the Ya being Y data and is stored in the unit storage area 1001 in the second image memory; and BYa is B-Y data that corresponds to the Ya and is stored in the unit storage area 1001 in the second image memory 900

Figures 19, 20:
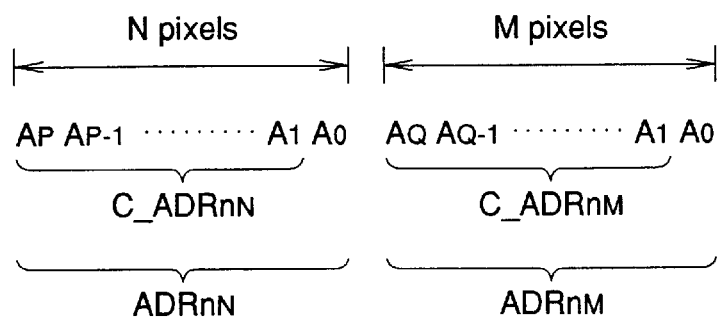
FIG. 19 is a diagram showing a format by which R-Y data and B-Y data are stored into the second image memory.
FIG. 20 is a diagram illustrating a construction of a storage address C_ADRn to be used for R-Y data and B-Y data.

FIG. 19 is a diagram illustrating a storage format by which the R-Y data and B-Y data are stored in the second image memory 900. In FIG. 19, "C_ADRn(a), . . . C_ADRn(n), . . . " are storage addresses; and "RYa(7) . . . RYa(0)BYa(7) . . . BYa(0) . . . , . . . RYn(7) . . . RYn(0) BYn(7) . . . BYn(0)" are data to be stored in the second image memory 900 (hereinafter referred to "storage data). R-Y data pairs with B-Y data, and this pair is stored in the second image memory so as to correspond to one storage address C_ADRn. In the fourth embodiment, for example, a storage data is composed of 16-bit data, and R-Y data and B-Y data constituting the storage data are composed of 8-bit data, respectively If the number of bits allowed for a storage data in the second image memory is insufficient, R-Y data and B-Y data may be stored in different addresses.

FIG. 20 is a diagram illustrating a construction of a storage address C_ADRn for R-Y data and B-Y data. In FIG. 20, a storage address ADRn for Y data comprises addresses $ADRn_N$ for Y direction and $ADRn_M$ for X direction (see FIG. 10) of the first image memory 6. The address $ADRn_N$ and $ADRn_M$ are expressed by binary numerals of "$A_p A_{p-1} \ldots A_1 A_0$" and "$A_Q A_{Q-1} \ldots A_1 A_0$", respectively.

On the other hand, a storage address C_ADRn for R-Y data and B-Y data comprises addresses C—$ADRn_N$ for Y direction and $C_{-ADRnN}$ for X direction (not shown) of the second image memory 900. The addresses C—$ADRn_N$ and C—$ADRn_M$ are expressed by binary numerals of "$A_p A_{p-1} \ldots A_1$" "$A_Q A_{Q-1} \ldots A_1$", respectively, which are generated by reducing least significant bit (low-order position) of the addresses $ADRn_N$ and $ADRn_M$. Accordingly, the number of addresses of the storage address C_ADRn for R-Y data and B-Y data is reduced to one-fourth of that of the storage address ADRn for Y data.

Figure 21:
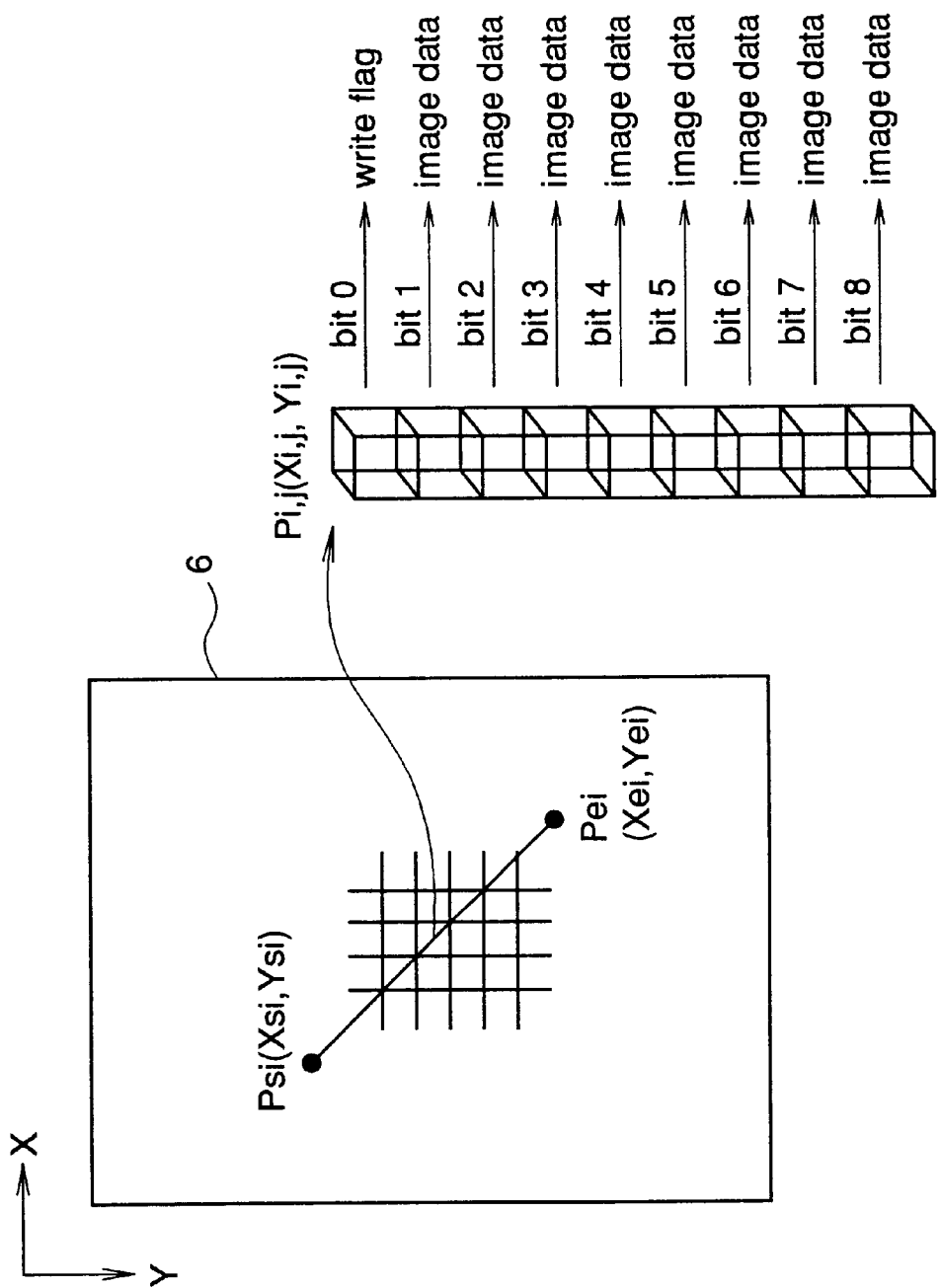
FIG. 21 is a diagram illustrating a state in which Y data is stored in the first image memory in the fourth embodiment.

FIG. 21 is a diagram illustrating a state in which the Y data 803 is stored in the first image memory 6 in the fourth embodiment. In FIG. 21, the same numeral number as in FIG. 6 designates the identical or corresponding one. Since Y data in the fourth embodiment is a gradation image data having 128 gradations, a storage bit of image data per pixel is set to be 8-bit.

An operation of the image processing apparatus so constructed will be described referring to FIGS. 17 and 18(A)–(C).

In FIGS. 17 and 18(A)–(C), R image data 400a, G image data 400b and B image data 400c, read by the line image sensor 1 are respectively converted into Y data 803, R-Y data 802, and B-Y data 801 by the luminance/chrominance conversion circuit 800. This conversion is executed by performing arithmetic based on the following equations:

$$Y=0.30R+0.59G+0.11B$$

$$R-Y=0.70R-0.59G-0.11B \tag{14}$$

$$B-Y=0.30R-0.59G+0.89B$$

Y data 803 is output to the connection processing circuit 111. The circuit 111 detects a position error from the Y data 803 and a storage data 64 in the first image memory 6, according to the same processing as in the first embodiment and, based on the detected position error, corrects a scanning position while sequentially storing the Y data 803 into a storage address ADRn of the first image memory 6, as a mapping data Pn.

R-Y data 802 and B-Y data 801 are output to the data reduction circuit 810 As shown in FIGS. 18(A)–(C), the data reduction circuit 810 reduces R-Y data 802 and B-Y data 801 to one-fourth by leaving only RYa and BYa corresponding to Ya among four Y data (Ya to Yd), stored in four adjacent unit storage areas 1001 in the first image memory 6. As shown in FIG. 20, the data reduction circuit 810 reduces a storage address ADRn input from the connection processing circuit 111 so as to correspond to the reduction processing of R-Y data and B-Y data, to generate a storage address C_ADRn; and using the obtained storage address C_ADRn, sequentially stores, as a mapping data, the reduced R-Y data 812 and B-Y data 811 into the second image memory 900 as shown in FIG. 19. This reduction processing utilizes characteristics that human eyes are less sensitive to chrominance information than luminance information, and therefore, even when chrominance information amount is reduced, image quality does not deteriorate. It has been utilized in NTSC system of television broadcast and the like.

To use the image data thus stored, through the interface 114, Y data is read from the first image memory 6 via the connection processing circuit 111; and R-Y data and B-Y data are read from the second image memory 900 via the data reduction circuit 810. Then, the read Y data, R-Y data and B-Y data are converted into image data of three primary colors R, G, B, by performing arithmetic based on the following equations:

$$R=(R-Y)+Y$$

$$B=(B-Y)+Y \tag{15}$$

$$G=-0.51(R-Y)-0.19(B-Y)+Y$$

In this conversion, only RYa data and BYa data which are left after the aforesaid reduction processing are respectively employed for four Y data (Ya to Yd), as shown in dotted lines in FIGS. 18(b) and 18(c).

By reproducing images from the image data of three primary colors R, G, B, color images being connected and composed are reproduced. This enables to reduce the storage capacity of the second image memory 900 for storing chrominance image data (R-Y data and B-Y data) to one-fourth, compared with the case in which no reduction processing is performed. The memory capacity required in reading color images may triple that for monochromatic image, but it is possible to reduce to one-second.

Although the reduction in the foregoing description is so performed that one left chrominance image data represents other three data, all required for the left data value is to approximately represent the value of a data group serving as a reduction target. For example, an average value of a data group (four data in the fourth embodiment) may be employed as a representative value. Although data is reduced to one-fourth, the degree of reduction can be appropriately selected depending on necessary image quality and the like.

When an image processing apparatus is exclusively used for reading character information, the connection processing circuit 111 may have a binarization circuit as in the first embodiment 1. In this case, the capacity of the first image memory 6 can be further reduced.

In the foregoing description, although luminance image data and chrominance image data are employed as a gradation image data of color image data, and chromatic image data, respectively, lightness image data may be replaced with luminance image data, and hue image data may be replaced with chrominance image data, by using color system, such as L*a*b* (L star, a star, b star) and L*u*v* (L star, u star, v star). In this case, the operation amount will increase, but reduction of chromatic image data can be performed in the same manner as in the foregoing description, leading to a reduction of memory capacity.

In addition, although the data amount of chrominance image data is decreased by reducing the chrominance image data in the foregoing description, the data amount of chrominance image data may be decreased by keeping the chrominance image data in a state of being later capable of reproducing color image data together with luminance image data. For example, the data amount of chrominance image data may be decreased by compressing the chrominance image data, as described below.

Specifically, in order to connect and compose images while correcting position error amount in real time, a bitmap structure is advantageous as a target image of correlation processing, in view of processing speed. When luminance image data is subjected to variable-length compression and a bitmap structure is broken, it is necessary to perform compression and expansion at the same time, thus decreasing the speed.

Chrominance image data, however, need not be interlocked with the connection processing circuit 111 that performs connection and composition while correcting position errors, so that it is free from the aforesaid problems as in luminance image data. Therefore, it is possible to further increase data reduction rate of chrominance image data by compression techniques, such as chrominance image data using JPEG, DPCM, vector quantization and arithmetic coding. In this case, color image can be reproduced by expanding compressed chrominance image data and employing it together with luminance data. In place of luminance data and chrominance image data, when used gradation image data except for luminance data, or used chromatic image data except for chrominance image data, it is possible to further increase data reduction rate of chromatic image data by compressing the chromatic image data in the same manner. The chromatic image data thus reduced may be kept in a state where it can later reproduce color image data having a predetermined quality, by employing together with gradation image data, it is not necessarily required to be a state of being capable of reproducing an original color image data before reading.

Thus in accordance with the fourth embodiment, it is possible to provide an image processing apparatus capable of reading color images with reduced memory costs, by reduction in data amount by employing monochromatic luminance data or lightness data for a processing part requiring real-time processing at high speed, and performing reduction or compression processing for chrominance image data, or saturation image data and hue image data, which require no high speed data processing.

As described previously, since human eyes are insensitive to chromatic compositions of color image, reduction or compression of chromatic compositions does not affect on providing an image processing apparatus capable of reading color images with sufficient image quality. The processing of images read by the line image sensor 1 in the first to fourth embodiments may be performed by software in PC (personal computer), MPU (micro processor unit), DSP (digital signal processor).

In the first to fourth embodiment, the first and second image memories may be realized in two areas of a memory, and the correction information memory 112 may be realized in other area of the memory.

What is claimed is:

1. An image processing apparatus that inputs a plurality of color image data and a reading position of an image sensor corresponding to the color image data at predetermined intervals, comprising image converting means for converting the plurality of color image data into luminance image data and chrominance image data;

position error detecting means for detecting a position error of the reading position of the image sensor employing the luminance image data, and calculating a position correction value for correcting the position error in a direction of suppressing;

first storing means for storing the luminance image data in a first memory; and second storing means for thinning and storing the chrominance image data at each predetermined interval in a second memory, wherein a position error of the chrominance image data stored in the second memory and the luminance image data stored in the first memory are corrected employing the position correction value in order to obtain a synthesized image.

2. An image processing apparatus that inputs a plurality of color image data and a reading position of an image sensor corresponding to the color image data at predetermined intervals, comprising first storing means for storing the reading position of the image sensor corresponding to the color image data in a first memory at the predetermined intervals;

second storing means for storing the plurality of color image data in a second memory at the predetermined intervals; and a position error detection means for, after reading an original, converting the plurality of color image data stored in the second memory to a lessor amount of image data, and detecting a position error of the reading position of the image sensor employing the image data having the lesser data amount and the reading position of the image sensor stored in the first storing means, to calculate a position correction value for correcting the position error in a direction suppressing the position error, and wherein the plurality of color image data stored in the second storing means are corrected on the basis of the position correction value to obtain a color synthesized image.

* * * * *

UNITED STATES PATENT AND TRADEMARK OFFICE
CERTIFICATE OF CORRECTION

PATENT NO. : 6,345,116 B1
DATED : February 5, 2002
INVENTOR(S) : Akio Kojima et al.

It is certified that error appears in the above-identified patent and that said Letters Patent is hereby corrected as shown below:

Title page,
Item [75] Inventors, change "Thuneharu Tomita" to -- Tsuneharu Tomita --.

Signed and Sealed this

Twenty-first Day of May, 2002

Attest:

*Attesting Officer*

JAMES E. ROGAN
*Director of the United States Patent and Trademark Office*